(12) United States Patent
Gane et al.

(10) Patent No.: US 7,666,275 B2
(45) Date of Patent: Feb. 23, 2010

(54) COMPOSITE CO-STRUCTURED OR CO-ADSORBED, MINERAL OR ORGANIC FILLER OR PIGMENT COMPOUNDS AND THE USE THEREOF

(75) Inventors: Patrick A. Gane, Rothrist (CH); Matthias Buri, Rothrist (CH)

(73) Assignee: Omya AG, Oftringen (CH)

( * ) Notice: Subject to any disclaimer, the term of this patent is extended or adjusted under 35 U.S.C. 154(b) by 92 days.

(21) Appl. No.: 11/956,944

(22) Filed: Dec. 14, 2007

(65) Prior Publication Data

US 2008/0093039 A1 Apr. 24, 2008

Related U.S. Application Data

(60) Division of application No. 11/305,092, filed on Dec. 19, 2005, which is a division of application No. 10/827,531, filed on Apr. 20, 2004, now Pat. No. 7,311,802, which is a continuation of application No. 09/646,897, filed as application No. PCT/IB99/00941 on Apr. 6, 1999, now abandoned.

(30) Foreign Application Priority Data

| Apr. 9, 1998 | (FR) | ................................... 98/04714 |
| Nov. 30, 1998 | (FR) | ................................... 98/15244 |

(51) Int. Cl.
*D21H 11/00* (2006.01)
(52) U.S. Cl. .................. 162/181.1; 162/181.2; 162/135; 162/136; 162/137; 428/342; 106/206.1
(58) Field of Classification Search ............. 162/181.1, 162/135, 136, 137; 428/342; 106/217
See application file for complete search history.

(56) References Cited

U.S. PATENT DOCUMENTS

| 4,284,546 | A | 8/1981 | Delfosse et al. |
| 4,547,331 | A | 10/1985 | Batstra |
| 5,076,846 | A | 12/1991 | Buri et al. |
| 5,120,365 | A | 6/1992 | Kogler |
| 5,152,835 | A | 10/1992 | Nemeh |
| 5,439,558 | A | 8/1995 | Bergmann et al. |
| 5,472,498 | A | 12/1995 | Stephenson et al. |
| 5,584,924 | A | 12/1996 | Arrington-Webb et al. |
| 5,605,568 | A | 2/1997 | Naydowski et al. |
| 5,662,731 | A | 9/1997 | Andersen et al. |
| 6,666,953 | B1 | 12/2003 | Gane et al. |
| 7,311,802 | B2 | 12/2007 | Gane et al. |
| 2006/0096725 | A1 | 5/2006 | Gane et al. |
| 2006/0156956 | A1 | 7/2006 | Gane et al. |

FOREIGN PATENT DOCUMENTS

| EP | 0401790 | 12/1990 |
| EP | 0 625 611 A1 | 11/1994 |
| JP | 55-62296 | 5/1980 |
| JP | 59-120657 | 7/1984 |
| JP | 62-101664 | 5/1987 |
| JP | 2-6560 | 1/1990 |
| JP | 6-507195 | 8/1994 |
| JP | 9-132514 | 5/1997 |
| WO | WO 92/02468 | 2/1992 |
| WO | WO 92/19685 | 11/1992 |
| WO | WO96/28517 | 9/1996 |

OTHER PUBLICATIONS

U.S. Appl. No. 12/426,748, filed Apr. 20, 2009, Gane, et al.

*Primary Examiner*—Mark Halpern
(74) *Attorney, Agent, or Firm*—Oblon, Spivak, McClelland, Maier & Neustadt, L.L.P.

(57) ABSTRACT

Composite compounds of co-structured or co-adsorbed organic or mineral fillers or pigments containing at least two organic or mineral fillers or pigments of a different nature and the use thereof in the paper industry for manufacturing paper, filling or coating or for any other surface treatment of the paper as well as wood or metal or plastic or cement surface treatment compounds in the fields of aqueous and non-aqueous paints and plastics materials.

Coatings colors, uncoated filling compound and sheets of base paper for coating containing them.

3 Claims, 5 Drawing Sheets

COMPOSITE CO-STRUCTURED OR CO-ADSORBED, MINERAL OR ORGANIC FILLER OR PIGMENT COMPOUNDS AND THE USE THEREOF

BACKGROUND OF THE INVENTION

1. Field of the Invention

The present invention relates to the field of composite compounds of mineral or organic fillers or pigments containing at least two mineral or organic fillers or pigments of different natures and the uses thereof in the paper industry for manufacturing paper, for filling or coating purposes, or for any other surface treatment of the paper, as well as in the field of aqueous and non-aqueous paints and in the plastics industry.

2. Description of the Related Art

Composite pigments or fillers are commonly used these days for the manufacture of all types of paper, filling and coating or any other surface treatment of the paper in order to improve the quality of the paper in terms of its properties of opacity, whiteness and brightness of the sheets of paper, for example, or to improve the printability characteristics.

One widely used technique of producing composite pigments or fillers consists in mixing a mineral filler, such as a natural calcium carbonate for example, with a mineral filler such as talc (FR 2 526 061) or alternatively a mineral filler such as talc with another mineral filler such as calcined kaolin (EP 0 365 502).

Two other types of process are also known from the prior art for producing composite pigments or fillers meeting the requisite criteria for use in the paper industry.

A first category of these processes known from the prior art involves forming networks between the pigment particles, thereby creating numerous internal voids which then enhance the optical properties of the pigment fillers, often measured by a light scattering coefficient S.

Accordingly, patent WO 92/08755 describes a method of forming aggregates by flocculation and optionally by in situ precipitation of calcium carbonate, this flocculation occurring consecutively with the ionic interactions produced by using anionic polymers with a high molecular weight to flocculate the mineral particles to which multivalent cations such as the calcium ion are added on the surface.

Similarly, U.S. Pat. No. 5,449,402 discloses a product obtained by a method of creating internal voids based on ionic or electrostatic interactions, whilst U.S. Pat. No. 5,454,864 or U.S. Pat. No. 5,344,487 or EP 0 573 150 propose a composite pigment, the preparation of which is based on the attraction forces of ions.

These methods based on ionic attraction forces are sensitive to the ionic forces at play in the formulas used for paper coating colors or for paper filling and there is no guarantee that these pigments can be used in applications such as paper coating or paper filling.

A second category of these methods known from the prior art as a means of producing pigments with improved optical characteristics is based on using organic compounds of silicon (U.S. Pat. No. 4,818,294; U.S. Pat. No. 5,458,680) or chloride-based compounds (U.S. Pat. No. 4,820,554; U.S. Pat. No. 4,826,536; WO 97/24406).

Finally, a last known method of improving whiteness (WO 97/32934) consists in coating the pigment particles with another pigment particle such as very fine particles of precipitated calcium carbonate. However, a method of this type is not Lased on using an organic binding agent which creates a co-structure.

Faced with this problem of improving optical properties, such as opacity, whiteness, colouring or brightness, for example, or improving printability characteristics, the applicant has developed, for the purposes of this invention, composite compounds, which are dry or non-aqueous or aqueous, of mineral or organic fillers or pigments which will improve at least one of the optical properties or printability required in the various fields of application, whilst providing a macroscopically homogeneous and stable compound in spite of the ionic forces present in the known formulas, such as offset or rotogravure paper coating colors or paper filling. Accordingly, one of the objectives of the invention is to provide dry or non-aqueous or aqueous composite compounds of mineral or organic fillers or pigments containing at least two mineral or organic fillers or pigments of a physically or chemically different nature.

SUMMARY OF THE INVENTION

The composite compounds of organic or mineral fillers or pigments proposed by the invention and constituting one of the objects thereof, which exhibit the qualities outlined above, are characterised in that they contain a) at least two organic or mineral fillers or pigments, at least one of which has a surface having at least one hydrophilic site and the other at least having a surface with at least one organophilic site b) at least one binding agent and in that they are co-structured or co-adsorbed, i.e. the different mineral or organic particles exhibit a structural cohesion imparted by creating a bond or an adhesion between at least two particles with different surface states.

Consequently, throughout this description the words co-structure or co-structured or co-adsorbed are used by the applicant as meaning the creation of a bond between at least two fillers or pigments of any type by forming a structure comparable to a bond or an adhesion between the surface of a filler or pigment having at least one hydrophilic site and the surface of the other filler or pigment having at least one organophilic site using a binding agent which is an organic compound. This binder may be supported by a gas such as air or any other gas.

Furthermore, another objective of the invention is to develop stable composite compounds which can be transported and stored for several weeks.

Yet another objective of the invention is to develop a composite compound of a macroscopically homogeneous structure, this being achieved by macroscopically stable paper coating colors which contain the above-mentioned composite aqueous compounds.

Moreover, another objective of the invention is the use of these composite compounds as organic or mineral fillers or pigments for the manufacture of paper, filling and/or coating and/or any other compound used to treat the surface of paper, as well as in the field of paints and the field of plastics.

BRIEF DESCRIPTION OF THE DRAWINGS

Graph 1 shows the force that is necessary to be applied to each of two disks each having a surface bonded film of printing ink on a disk substrate in order to separate the film from the disk after printing, the printing films having the coating colors of Tests 119 and 120.

Graph 2 shows the force that is necessary to be applied to each of two disks each having a surface bonded film of printing ink on a disk substrate in order to separate the film from the disk after printing, the printing films having the coating colors of Tests 121 and 122.

Figure 1:
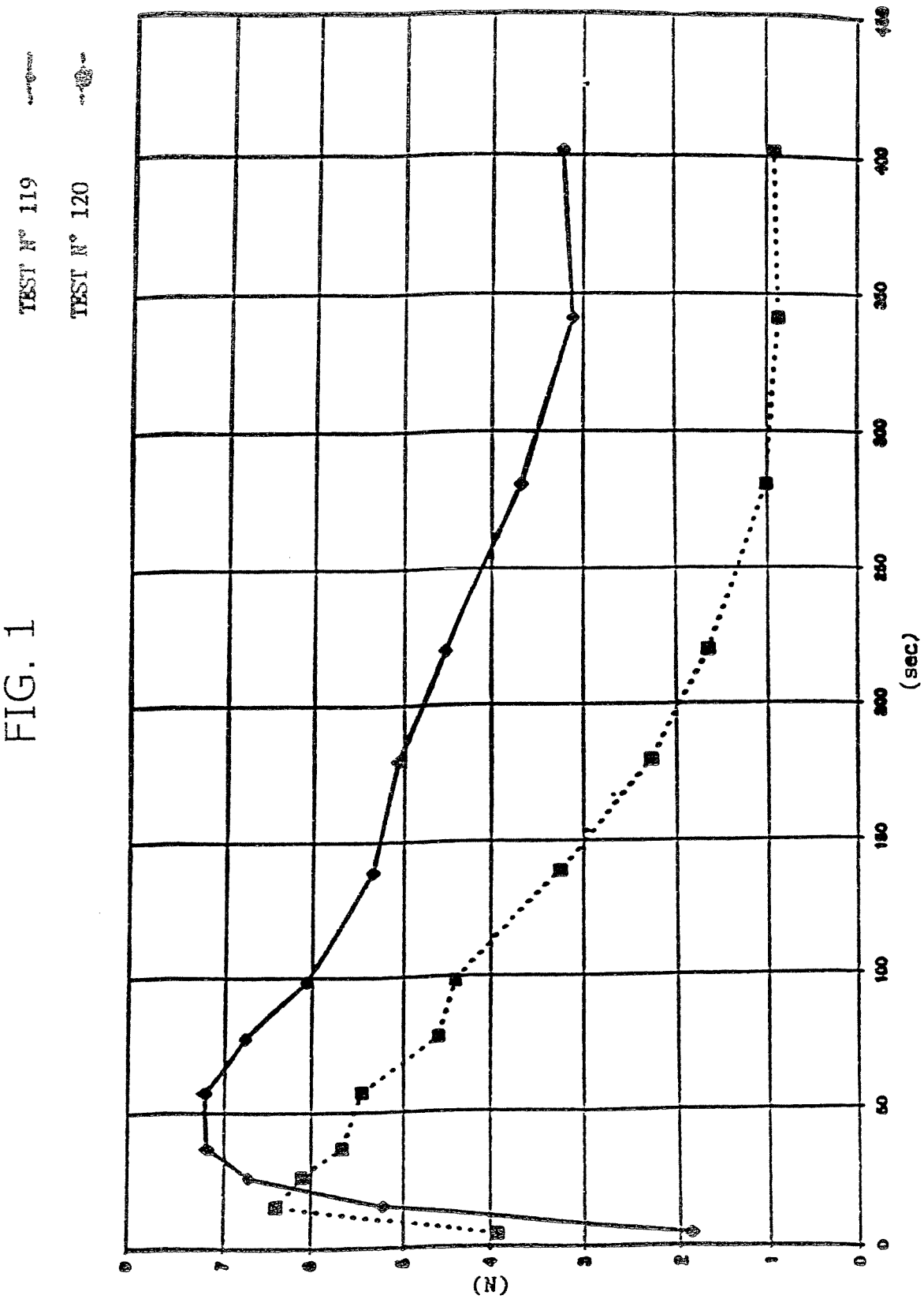
Figure 2:
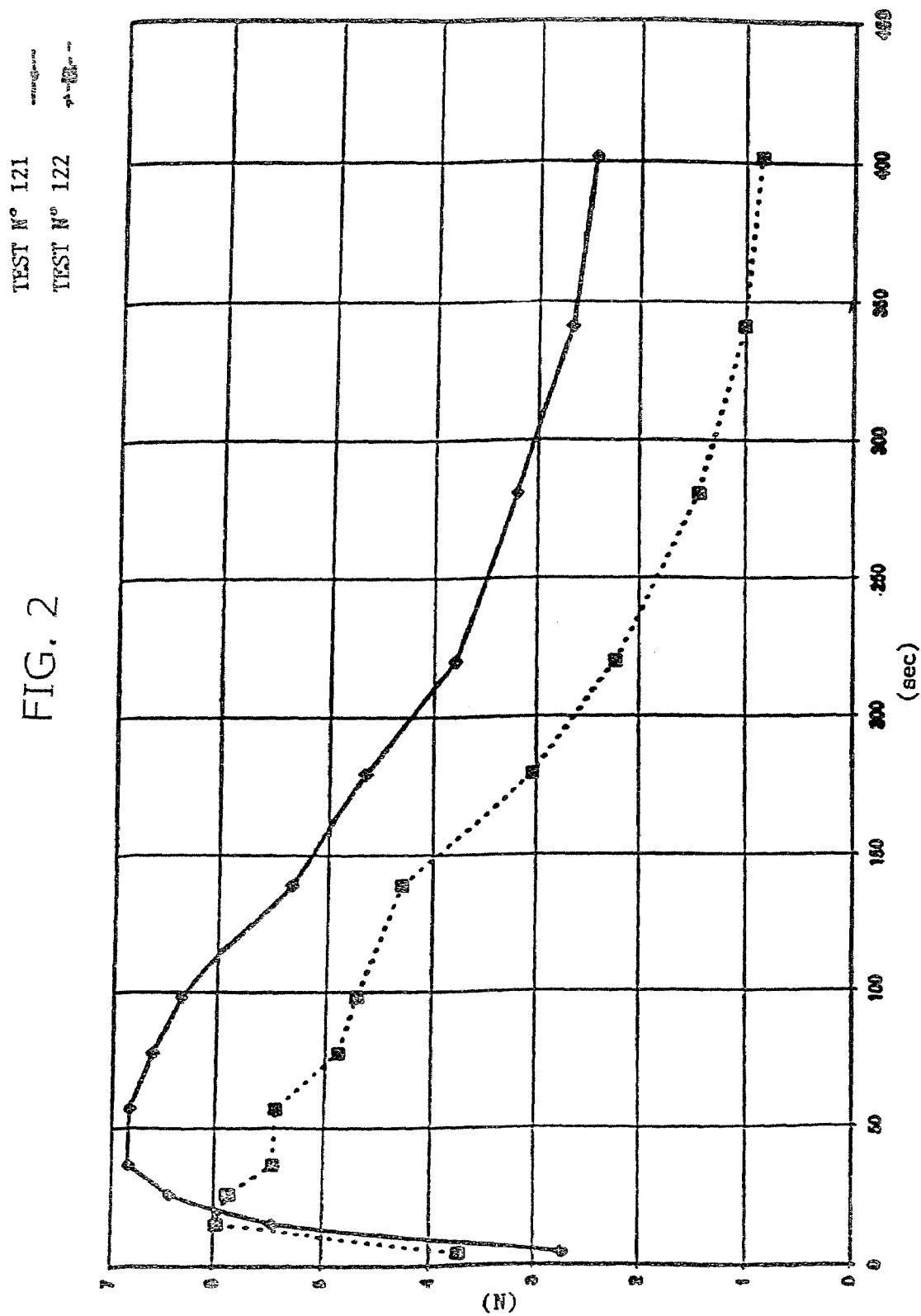
Figure 3:
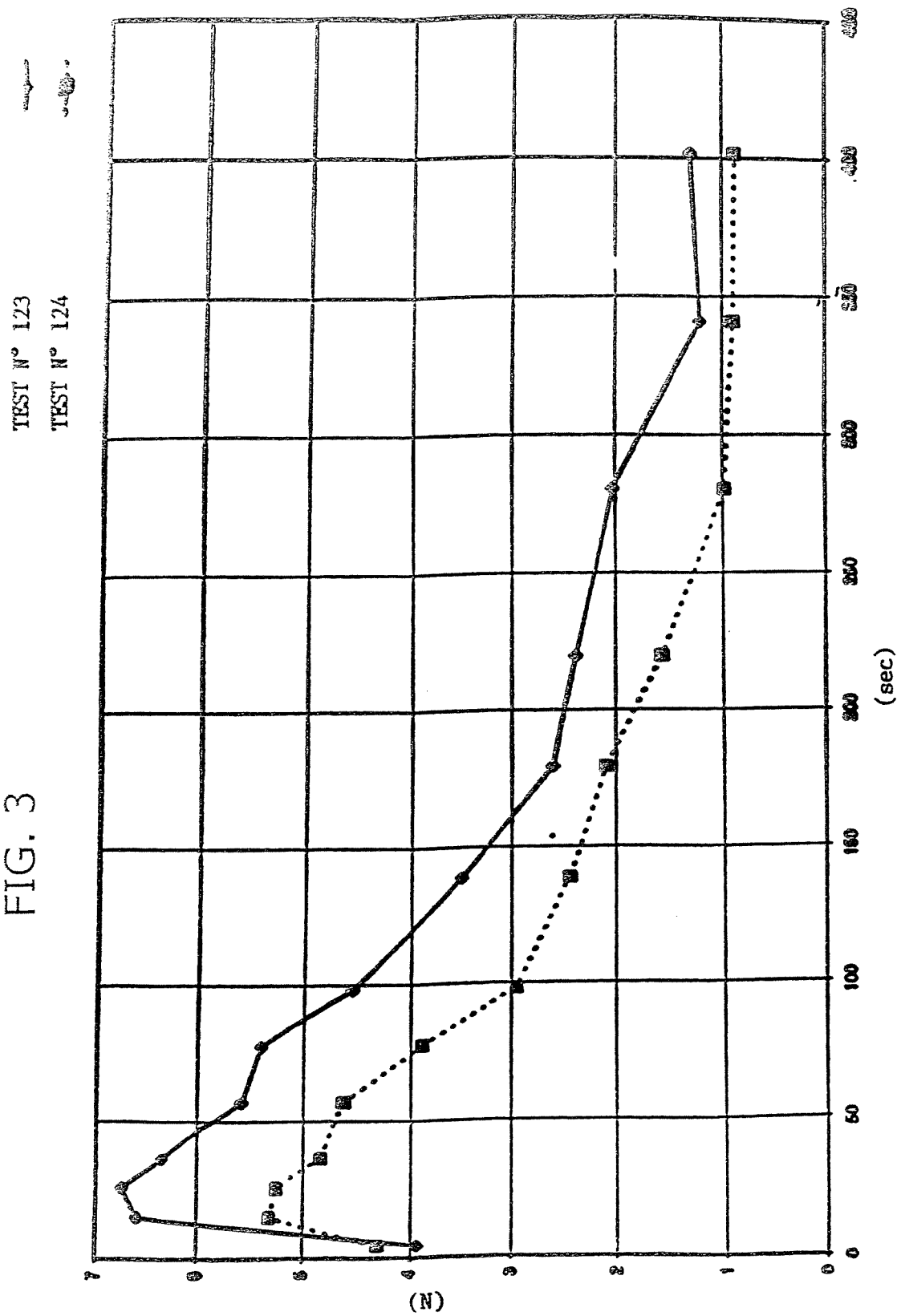
Figure 4:
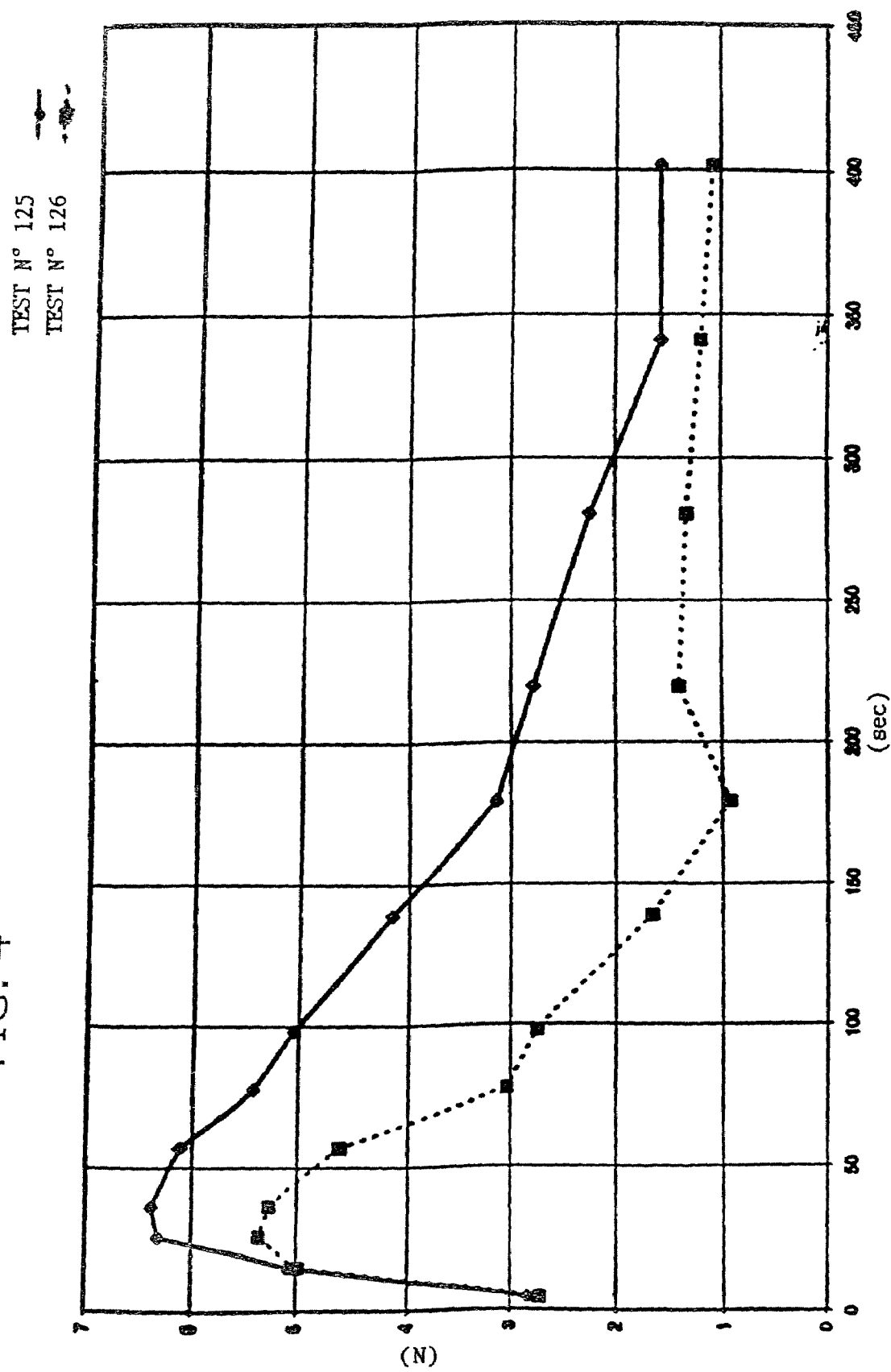
Figure 5:
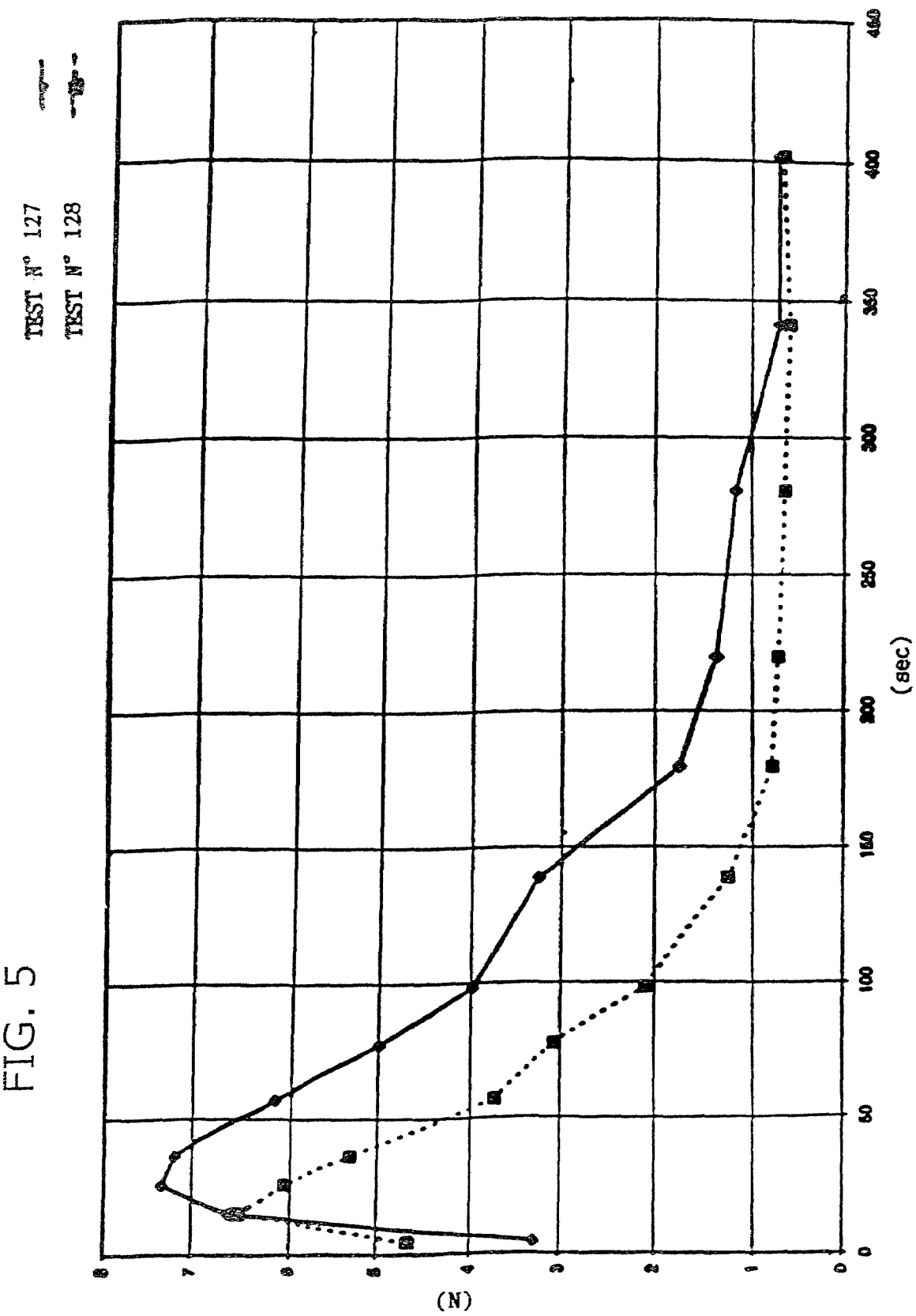

Graph 3 shows the force that is necessary to be applied to each of two disks each having a surface bonded film of printing ink on a disk substrate in order to separate the film from the disk after printing, the printing films having the coating colors of Tests 123 and 124.

Graph 4 shows the force that is necessary to be applied to each of two disks each having a surface bonded film of printing ink on a disk substrate in order to separate the film from the disk after printing, the printing films having the coating colors of Tests 125 and 126.

Graph 5 shows the force that is necessary to be applied to each of two disks each having a surface bonded film of printing ink on a disk substrate in order to separate the film from the disk after printing, the printing films having the coating colors of Tests 127 and 128.

DETAILED DESCRIPTION OF THE PREFERRED EMBODIMENTS

Referring now to the drawings, wherein like reference numerals designate identical or corresponding parts throughout the several views.

Obviously, numerous modifications and variations of the present invention are possible in light of the above teachings. It is therefore to be understood that within the scope of the appended claims, the invention may be practiced otherwise than as specifically described herein.

Finally, another objective of the invention is to provide suspensions containing the composite compounds proposed by the invention and to provide paper coating colors-or compounds for treating the surface of paper or uncoated filling compounds that will improve at least one of the properties, such as opacity, whiteness, brightness or printability.

It should be pointed out that the improvement made to these properties will depend on the field in which the skilled person wishes to adapt the properties to suit the desired application.

These objectives are achieved by placing the surface of one of the pigments or fillers in contact with the surface of the other of the pigments or fillers in the presence of a binding agent so that this contact causes a structure to form, between at least two mineral or organic particles of a different physical or chemical nature, i.e. causes a structure to form between them, at least one of them having a surface with at least one hydrophilic site and at least one of them having a surface with at least one organophilic site.

By mineral or organic particle having a surface with at least one hydrophilic site, the applicant means a mineral or organic particle which is partially or totally wettable by polar substances without the influence of any external component and more specifically is partially or totally wettable by water.

The mineral or organic particles having a surface with at least one hydrophilic site may be of very different physical or chemical natures, such as natural calcium carbonate, for example chalk, calcite, marble or any other form of natural calcium carbonate, which may be obtained from a recycling process in particular, precipitated calcium carbonate, the dolomites, crystalline or amorphous aluminium hydroxides, natural or synthetic precipitated silicates, calcium sulphate, titanium dioxide, satin white, the wollastonites, huntite, calcined clays derived from recycling for example, starch or any other type of organophilic organic or mineral particles that have undergone physical processing such as Corona or chemical processing in order to produce at least one hydrophilic site.

By mineral or organic particle having a surface with at least one organophilic site, the applicant means a mineral or organic particle which is partially or totally wettable by an organic fluid or an organic substance, this wettability being independent of adsorption mechanisms such as electrostatic attraction or sequestration.

By mineral or organic particle having a surface with at least one organophilic site, the applicant means in particular a mineral or organic particle of very different physical or chemical natures such as talcs, micas, calcined clays or not, or zinc oxide or transparent iron pigments or colouring pigments such as phthalocyanine blue, polystyrene-based synthetic pigments, urea-formol resins, carbon black, cellulose fibres and flours or any other type of hydrophilic mineral or organic particles but which, after chemical or physical processing, have at least one organophilic site, i.e. are wettable by an organic fluid or an organic substance.

It should be pointed out that the quantities and ratios by dry weight of the various fillers or pigments making up the composite compounds proposed by the invention vary from 0.1% to 99.9% depending on the nature of the different pigments or fillers, and preferably from 25% to 95% by dry weight, relative to the total dry weight of the fillers or pigments, of mineral or organic fillers or pigments having a surface with at least one hydrophilic site and preferably between 75% and 5% by dry weight, relative to the total dry weight of the fillers or pigments, of mineral or organic fillers or pigments having a surface with at least one organophilic site.

The creation of a bond or a co-structure can be seen in the rheological behaviour of the composite compounds and by the properties of homogeneity in paper coating colors or in the printability of the paper.

It also increases the opacity of sheets of wood free paper filled at a rate of 75.5 g/m$^2$ with the composite compounds of the invention. This opacity is measured in compliance with the DIN 53146 standard using an Elrepho 2000 spectrophotometer made by Datacolor AG (Switzerland).

Accordingly, the composite compounds of mineral or organic fillers or pigments proposed by the invention are characterised in that they are co-structured or co-adsorbed, i.e. they have a high yield stress, as determined by a Stress Tech® machine, namely higher than and preferably at least four times higher than that of the standard mixture of corresponding fillers or pigments.

The composite compounds of mineral or organic fillers or pigments proposed by the invention are also characterised in that the different mineral or organic particles exhibit a cohesion which reflects the macroscopic homogeneity of the suspension of the composite compound and/or coating color containing the composite compound. This macroscopic homogeneity is expressed by measuring the content of one of the pigments or fillers at two different points of the suspension or of the coating color after it has been left to rest for several hours or several days.

Furthermore, the composite compounds of mineral or organic fillers or pigments proposed by the invention are characterised in that they contain at least one binding agent. This binding agent is an organic compound, which might be supported by a gas such as air or any other gas. This binding agent, an organic compound, must be partially or totally wettable by the surfaces of the pigments or fillers with which it is placed in contact. By preference, this binding agent is selected from among the acrylic or vinyl polymers and/or copolymers or polycondensates or polyaddition products such as the polymers or copolymers for example, in their totally acid state or partially neutralised or totally neutralised by neutralising agents containing monovalent or polyvalent cations or mixtures thereof, by one at least of the monomers such as acrylic and/or methacrylic, itaconic, crotonic, fumaric acid, maleic anhydride or isocrotonic, aconitic, mesaconic, sinapic, undecylenic, angelic acid and/or the respective esters thereof, acrylamido methyl propane sulphonic acid, acrolein, acrylamide and/or methacrylamide, methacrylamido propyl trimethyl ammonium chloride or sulphate, methacrylate of trimethyl ammonium ethyl chloride or sulphate, as well as their acrylate and acrylamide counterparts, quaternised or not, and/or dimethyldiallyl chloride, vinylpyrrolidone or a binding agent selected from among the linear or branched fatty acids or the linear or branched fatty alcohols or the linear or branched or cyclic fatty amines, saturated or not, or selected from among the quaternary salts preferably with linear or branched fatty chains of vegetable origin or not.

This binding agent may also be selected from among at least one of the above-mentioned monomers or mixtures thereof in the form of the monomer or monomers itself/themselves, polymerised in the presence of at least one of the mineral or organic particles.

Furthermore, it should be noted that optimisation of the molecular weight of the binding agent will depend on its chemical nature.

For the purposes of the invention, the quantity of binding agent used in the composite compound is from 0.01% to 10%, preferably from 0.10% to 1.5% by dry weight relative to the total dry weight of the fillers or pigments.

The composite compounds proposed by the invention may optionally be dispersed in water, in water-solvent mixtures or in other solvents using one or more dispersing agents known to the person skilled in the art, amongst others those described in patents EP 0 100 947, EP 0 542 643 or EP 0 542 644.

It is also important to note that the co-structured composite compounds proposed by the invention are compatible with other aqueous mineral or organic filler compounds, i.e. they form a stable and homogeneous mixture when they are simply mixed with these other suspensions, whereas it would be impossible to produce a homogeneous suspension if a co-structured composite compound as proposed by the invention were not used.

The paper coating colors and/or paper surface treatment compounds as well as wood or metal or plastic or cement surface treatment compounds-and/or aqueous or non-aqueous paint compositions proposed by the invention are prepared in a manner known to the person skilled in the art by mixing in water the dry or non-aqueous or aqueous mineral or organic composite compounds of fillers or pigments proposed by the invention and one or more binders of natural or synthetic origin such as starch, carboxymethyl cellulose, the polyvinyl alcohols, for example, or latex or polymeric dispersions of the styrene-butadiene or styrene-acrylate type or acrylic or vinyl or other polymeric dispersions.

In a known manner, the paper coating colors and/or paper surface treatment compounds as well as wood or metal or plastic or cement surface treatment compounds and/or aqueous or non-aqueous paint compositions may also contain the usual additives such as rheology modifiers, organic fillers, anti-foaming agents, optical brighteners, biocide agents, lubricants, alkaline hydroxides, colourings and others.

In addition, the aqueous suspensions containing the composite compounds, the paper coating colors and/or the paper surface-treatment compounds as well as wood or metal or plastic or cement surface treatment compounds and/or aqueous or non-aqueous paint compositions or the uncoated filling compositions proposed by the invention are characterised in that they contain dry or non-aqueous or aqueous composite compounds as proposed by the invention.

The aqueous suspensions containing the composite compounds, the paper coating colors and/or the paper surface-treatment compounds as well as wood or metal or plastic or cement surface treatment compounds and/or aqueous paint or non-aqueous compositions as proposed by the invention are also characterised in that they are macroscopically homogeneous.

This macroscopic homogeneity is determined by measuring the quantity of one of the fillers at the surface and the base of the flask containing the coating color diluted 40% or 20% with dry substance.

A comparison of this quantity of one of the fillers at the two "top" and "bottom" points of the compound proposed by the invention with the quantity of one of the fillers at these two "top" and "bottom" points of the standard mixture will demonstrate the fact that there is virtually no migration of one of the fillers to a preferred part of the compound of the invention, contrary to the situation that would arise with a standard mixture.

This macroscopic homogeneity of the composite compounds of the invention produces improved homogeneity in the sheet of paper due to a more even retention and distribution.

Moreover, the aqueous suspensions containing the composite compounds of the invention, the paper coating colors of the invention or the paper surface-treatment compounds of the invention are characterised in that the yield stress, as determined by a Stress Tech® machine, is higher than and preferably at least four times higher than the corresponding standard mixtures of fillers or pigments.

Furthermore, the aqueous suspensions of the invention or the coating colors of the invention or the paper surface-treatment compounds of the invention or the uncoated filling compounds of the invention will also exhibit an improvement in at least one of the optical properties such as opacity or whiteness or brightness or in the printability or print density properties.

Likewise, the aqueous or non-aqueous paint compositions containing the composite compounds of the invention have the advantage of an increased opacity.

Accordingly, by preference, the aqueous suspensions containing the composite compounds of the invention or the coating colors of the invention or the paper surface-treatment compounds of the invention as well as wood or metal or plastic or cement surface treatment compounds and/or aqueous or non-aqueous paint compositions are characterised in that they have a higher light scattering coefficient S than that of the corresponding standard mixtures.

The uncoated filling compounds proposed by the invention are preferably characterised in that they exhibit a higher opacity, determined in compliance with the DIN 53416 standard, than that of the corresponding standard mixtures.

Similarly, by preference, the aqueous suspensions containing the composite compounds of the invention or the coating colors of the invention or the paper surface-treatment compound of the invention or the uncoated filling compounds of the invention are characterised in that they have a higher whiteness, determined in compliance with the TAPPI T452 ISO 2470 standard, than that of the corresponding standard mixtures.

By preference, the coating colors or paper surface-treatment compounds proposed by the invention are characterised in that they exhibit a higher TAPPI 75° brightness according to Lehmann than that of a coating color containing standard suspensions of corresponding mixtures.

Finally, and by preference, the coating colors or paper surface-treatment compounds or uncoated filling compounds proposed by the invention are characterised in that the curve, plotted on the basis of the ISIT printability test, the conducting of which will be explained in example 9, representing the ink tack force as a function of time, exhibits less marked rising and falling slopes and a higher maximum value than coating colors or paper surface-treatment compounds or uncoated filling compounds containing standard suspensions of corresponding mixtures.

Furthermore, sheets of paper which contain in the mass the composite compounds proposed by the invention are characterised in that they exhibit a higher whiteness, determined in compliance with the TAPPI T452 ISO 2470 standard, than sheets of paper containing in the mass standard suspensions of mixtures of corresponding fillers or pigments and in that they exhibit a higher opacity, measured in compliance with the DIN 53146 standard, than sheets of paper containing standard suspensions of mixtures of corresponding fillers or pigments.

The scope and interest of the invention will be more readily understood from the examples set out below, which are not intended to be restrictive, particularly in terms of the order in which the various constituents of the composite compounds are added.

EXAMPLE 1

This example relates to the preparation of composite compounds containing different pigments or fillers.

The specific viscosities mentioned in all the examples are determined by the method defined in EP 0 542 643.

Test No 1:

This test, illustrating the prior art, is a standard mixture of 750 grams dry weight of a 72% aqueous suspension of a Norwegian marble with a grain size equivalent to one in which 75% of the particles are of a diameter of less than 1 Eun as measured on the Sedigraph 5100 and containing 1% by dry weight of an acrylic copolymer with a specific viscosity equal to 0.8 with 250 grams dry weight of an aqueous suspension of Finnish talc with a grain size equivalent to one in which 45% of the particles are of a diameter of less than 2 Eun as measured on the Sedigraph 5100 containing 0.08% by dry weight of soda, 1.4% by dry weight of an alkylene polyoxide and 0.15% by dry weight of a sodium polyacrylate with a specific viscosity of 0.4 in order to produce an aqueous suspension with a 70% concentration of a marble-talc mixture.

Test No 2:

For this test, illustrating the invention, the co-structured aqueous compound of the invention is prepared by adding in a mixer and under agitation:

750 grams dry of Norwegian marble having a grain size such that 75% of the particles are of a diameter of less than 1 µm as measured on the Sedigraph 5100, 250 grams dry weight of a talc from Finland with a grain size such that 45% of the particles are of a diameter of less than 2 µm as measured on the Sedigraph 5100, 5 grams dry weight of an acrylic copolymer binding agent of a monomer composition comprising 90% by weight of acrylic acid and 10% by weight of tristyrylphenol methacrylate with 25 moles of ethylene oxide, the quantity of water needed to make up the co-structured aqueous compound of the invention to a 65% concentration of dry substance.

After agitating for 30 minutes and after formation of the co-structure between the grains of marble and talc with the aid of the binding agent, 5.2 grams dry weight of a dispersing agent of the prior art, namely a polyacrylate partially neutralised with soda and having a specific viscosity of 0.5, are added to the compound of the invention, the balance being added in the form of soda and water necessary to produce an aqueous suspension of the composite compound of the invention with a concentration of dry substance equal to 59.1% with a pH of between 9 and 10.

Test No 3:

This test, illustrating the prior art, is a standard mixture of 750 grams dry weight of a 72% aqueous suspension of Champagne chalk with a grain size equivalent to one in which 75% of the particles are of a diameter of less than 1 µm as measured on the Sedigraph 5100 and containing 0.80% by dry weight of a sodium polyacrylate with a specific viscosity equal to 0.5 with 250 grams dry weight of an aqueous suspension of a Finnish talc with a grain size equivalent to one in which 45% of the particles are of a diameter of less than 2 µm as measured on the Sedigraph 5100 containing 0.08% by dry weight of soda, 1.4% by dry weight of an alkylene polyoxide and 0.15% by dry weight of a sodium polyacrylate with a specific viscosity of 0.4 in order to produce an aqueous suspension with a 62.1% concentration of a chalk-talc-mixture.

Test No 4:

This test, illustrating the invention, is conducted in the same manner and using the same equipment as test No 2 replacing the marble with Champagne chalk of the same grain size.

This produces an aqueous suspension of the co-structured composite compound of the invention (75% by dry weight of chalk-25% by dry weight of talc) having a 57% concentration of dry substance.

Test No 5:

This test, illustrating the prior art, is a standard mixture of 750 grams dry weight of a 51% aqueous suspension of precipitated calcium carbonate with a grain size equivalent to one in which 60% of the particles are of a diameter of less than 2 µm as measured on the Sedigraph 5100 and dispersed with 0.3% by dry weight of a sodium polyacrylate with a specific viscosity equal to 0.7 with 250 grams dry weight of an aqueous suspension of a Finnish talc with a grain size equivalent to one in which 45% of the particles are of a diameter of less than 2 µm as measured on the Sedigraph 5100 containing 0.08% by dry weight of soda, 1.4% by dry weight of an alkylene polyoxide and 0.15% by dry weight of a sodium polyacrylate with a specific viscosity of 0.4 in order to produce an aqueous suspension with a 54.5% concentration of a precipitated calcium carbonate-talc mixture.

Test No 6:

This test, illustrating the invention, is conducted in the same manner and using the same equipment as test No 2 replacing the marble with precipitated calcium carbonate with a grain size equivalent to one in which 60% of the particles are of a diameter of less than 2 µm.

This produces an aqueous suspension of the co-structured composite compound of the invention (75% by dry weight of precipitated calcium carbonate-25% by dry weight of talc) having a 58% concentration of dry substance.

Test No 7:

This test, illustrating the prior art, is a standard mixture of 750 grams dry weight of a 72% aqueous suspension of Norwegian marble with a grain size equivalent to one in which 75% of the particles are of a diameter of less than 1 µm as measured on the Sedigraph 5100 and containing 1.00% by dry weight of an acrylic copolymer with a specific viscosity equal to 0.8 with 250 grams dry weight of an aqueous suspension of an Austrian mica with a grain size equivalent to one in which 18% of the particles are of a diameter of less than 1 μm as measured on the Sedigraph 5100 containing 0.25% by dry weight of a sodium polyacrylate with a specific viscosity of 0.4 in order to produce an aqueous suspension with a 68.6% concentration of a marble-mica mixture.

Test No 8:

This test, illustrating the invention, is conducted in the same manner and using the same equipment as test No_2 replacing the talc with Austrian mica with a grain size equivalent to one in which 18% of the particles are of a diameter of less than 1 μm.

This produces an aqueous suspension of the co-structured composite compound of the invention (75% by dry weight of marble-25% by dry weight of mica) having a 61.3% concentration of dry substance.

Test No 9:

This test, illustrating the prior art, is a standard mixture of 750 grams dry weight of a 72% aqueous suspension of Norwegian marble with a grain size equivalent to one in which 75% of the particles are of a diameter of less than 1 μm as measured on the Sedigraph 5100 and containing 1% by dry weight of an acrylic copolymer with a specific viscosity equal to 0.8 with 250 grams dry weight of an aqueous suspension of an English kaolin with a grain size equivalent to one in which 64% of the particles are of a diameter of less than 1 μm as measured on the Sedigraph 5100 containing 0.2% by dry weight of a sodium polyacrylate with a specific viscosity of 0.4 in order to produce an aqueous suspension with a 70.2% concentration of a marble-kaolin mixture.

Test No 10:

This test, illustrating the invention, is conducted in the same manner and using the same equipment as test No 2 replacing the talc with English kaolin having a grain size equivalent to one in which 64% of the particles are of a diameter of less than 1 μm as measured by the Sedigraph 5100.

This produces an aqueous suspension of the co-structured composite compound of the invention (75% by dry weight of marble-25% by dry weight of kaolin) having a 62.1% concentration of dry substance.

Test No 11:

This test, illustrating the prior art, is a standard mixture of 750 grams dry weight of a 72% aqueous suspension of Norwegian marble with a grain size equivalent to one in which 75% of the particles are of a diameter of less than 1 μm as measured on the Sedigraph 5100 and containing 1% by dry weight of an acrylic copolymer with a specific viscosity equal to 0.8 with 250 grams dry weight of an aqueous suspension of a titanium dioxide of the rutile type with a grain size equivalent to one in which 86% of the particles are of a diameter of less than 1 μm as measured on the Sedigraph 5100 containing 0.32% by dry weight of a sodium polyacrylate with a specific viscosity of 0.4 in order to produce an aqueous suspension with a 71.5% concentration of a marble-titanium dioxide mixture.

Test No 12:

For this test, illustrating the invention, the co-structured compound is prepared in the same manner and using the same equipment as test No 2 replacing the talc with titanium dioxide of the rutile type having a grain size equivalent to one in which 86% of the particles are of a diameter of less than 1 μm.

After the co-structure has formed between the grains of marble and titanium dioxide with the aid of a binding agent, 0.15% by dry weight of a dispersing agent known from the prior art is added, namely a sodium polyacrylate with a specific viscosity of 0.5.

This produces an aqueous suspension of the co-structured composite compound of the invention (75% by dry weight of marble-25% by dry weight of titanium dioxide) having a 58.8% concentration of dry substance.

Test No 13:

This test, illustrating the prior art, is a standard mixture of 750 grams dry weight of a 72% aqueous suspension of Norwegian marble with a grain size equivalent to one in which 75% of the particles are of a diameter of less than 1 μm as measured on the Sedigraph 5100 and containing 1% by dry weight of an acrylic copolymer with a specific viscosity equal to 0.8 with:
  125 grams dry weight of an aqueous suspension of English kaolin with a grain size equivalent to one in which 64% of the particles are of a diameter of less than 1 μm as measured on the Sedigraph 5100 and containing 0.3% by dry weight of a sodium polyacrylate with a specific viscosity of 0.4
  125 grams dry weight of an aqueous suspension of Finnish talc with a grain size equivalent to one in which 45% of the particles are of a diameter of less than 2 μm as measured on the Sedigraph 5100 and containing 0.08% by dry weight of soda, 1.4% by dry weight of an alkylene polyoxide and 0.15% by dry weight of a sodium polyacrylate with a specific viscosity of 0.4 in order to produce an aqueous suspension with a 70.2% concentration of dry substance in a marble-kaolin-talc mixture.

Test No 14:

This test, illustrating the invention, is conducted in the same manner and using the same equipment as test No 2 replacing half of the talc with English kaolin having a grain size equivalent to one in which 64% of the particles are of a diameter of less than 1 μm as measured by the Sedigraph 5100.

This produces an aqueous suspension of the co-structured composite compound of the invention (75% by dry weight of marble-12.5% by dry weight of kaolin-12.5% by dry weight of talc) having a 60.0% concentration of dry substance.

Test No 15:

This test, illustrating the prior art, is a standard mixture of 800 grams dry weight of a 72% aqueous suspension of Norwegian marble with a grain size equivalent to one in which 75% of the particles are of a diameter of less than 1 μm as measured on the Sedigraph 5100 and containing 1% by dry weight of an acrylic copolymer with a specific viscosity equal to 0.8 with 200 grams dry weight of an aqueous suspension of crystalline aluminium hydroxide with a grain size equivalent to one in which 72% of the particles are of a diameter of less than 2 μm as measured on the Sedigraph 5100 and containing 0.3% by dry weight of a sodium polyacrylate with a specific viscosity of 0.7 in order to produce an aqueous suspension with a 70.9% concentration of dry substance in a marble-aluminium hydroxide mixture.

Test No 16:

For this test, illustrating the invention, the co-structured aqueous compound proposed by the invention is prepared by introducing into a mixer under agitation:
  800 grains dry weight of a Norwegian marble with a grain size such that 75% of the particles are of a diameter of less than 1 μm as measured on the Sedigraph 5100,
  200 grams dry weight of crystalline aluminium hydroxide with a grain size such that 72% of the particles are of a diameter of less than 2 μm as measured on the Sedigraph, 4 grams dry weight of an acrylic copolymer binding agent of a monomer composition comprising 90% by dry weight of acrylic acid and 10% by dry weight of tristyrylphenol methacrylate with 25 moles of ethylene oxide, the quantity is made up with the water necessary to produce a co-structured aqueous compound of the invention with a 65% concentration of dry substance.

After 30 minutes of agitation and once the co-structure has formed between the grains of marble and aluminium hydroxide with the aid of the binding agent, 5.6 grams by dry weight of a dispersing agent known from the prior art are added to the compound of the invention, namely a polyacrylate partially neutralised with soda and of a specific viscosity of 0.5, as well as the soda and water required to obtain an aqueous suspension of the composite compound of the invention having a concentration of dry substance equal to 60.3% and with a pH value of between 9 and 10.

Test No 17:

This test, illustrating the prior art, is a standard mixture of 800 grams dry weight of a 72% aqueous suspension of Norwegian marble with a grain size equivalent to one in which 75% of the particles are of a diameter of less than 1 µm as measured on the Sedigraph 5100 and containing 1% by dry weight of an acrylic copolymer with a specific viscosity equal to 0.8 with 200 grams dry weight of an aqueous suspension of a urea-formol condensate with a specific surface area equal to 17 m²/g as measured by the BET method (DIN 66132) and containing 0.5% by dry weight of a sodium polyacrylate with a specific viscosity of 0.7 in order to produce an aqueous suspension with a 45.1% concentration of dry substance in a marble-urea-formol condensate mixture.

Test No 18:

This test, illustrating the invention, is conducted in the same manner and using the same equipment in all respects as test No 16 replacing the aluminium hydroxide with a urea-formol condensate having a specific surface area of 17 M²/g as measured by the BET method (DIN 66132).

This produces an aqueous suspension of the co-structured composite compound of the invention (80% by dry weight of marble-20% by dry weight of a urea-formol condensate) having a 51.2% concentration of dry substance.

Test No 19:

This test, illustrating the prior art, is a standard mixture of 800 grams dry weight of a 72% aqueous suspension of Norwegian marble with a grain size equivalent to one in which 75% of the particles are of a diameter of less than 1 µm as measured on the Sedigraph 5100 and containing 1% by dry weight of an acrylic copolymer with a specific viscosity equal to 0.8 with 200 grams dry weight of an aqueous suspension of bleached cellulose with a grain size equivalent to one in which 99% of the particles are of a diameter of less than 75 µm as measured by an airflow sieve of the Alpine LS 200 type and containing 0.5% by dry weight of a sodium polyacrylate with a specific viscosity of 0.7 in order to produce an aqueous suspension with a 44.8% concentration of dry substance in a marble-bleached cellulose mixture.

Test No 20:

This test, illustrating the invention, is conducted in the same manner and using the same equipment in all respects as test No 16 replacing the aluminium hydroxide with bleached cellulose with a grain size equivalent to on in which 99% of the particles are of a diameter of less than 75 µm as measured by an airflow sieve of the Alpine LS 200 type.

This produces an aqueous suspension of the co-structured composite compound of the invention (80% by dry weight of marble-20% by dry weight of bleached cellulose) having a 46.9% concentration of dry substance.

Test No 21:

This test, illustrating the prior art, is a standard mixture of 500 grams dry weight of a Champagne chalk with a grain size equivalent to one in which 45% of the particles are of a diameter of less than 2 µm as measured on the Sedigraph 5100 with 500 grams of an Australian talc with a grain size equivalent to one in which 25% of the particles are of a diameter of less than 2 µm as measured by the Sedigraph 5100 to produce a powdered chalk-talc mixture with a 100% concentration of dry substance.

Test No 22:

For this test, illustrating the invention, the co-structured compound is prepared in a powdered form as proposed by the invention, by introducing into a mixer under agitation:

500 grams dry weight of a Champagne chalk of a grain size such that 45% of the particles are of a diameter of less than 2 µm as measured on the Sedigraph 5100, 500 grams dry weight of a talc from Australia of a grain size such that 25% of the particles are of a diameter of less than 2 µm as measured on the Sedigraph 5100, 10 grams dry weight of an acrylic copolymer binding agent of a monomer composition comprising 90% by dry weight of acrylic acid and 10% by dry weight of tristyrylphenol methacrylate with 25 moles of ethylene oxide.

Test No 23:

This test, illustrating the prior art, is a simple mixture of 900 grams dry weight of an aqueous suspension of a Finnish talc with a grain size equivalent to one in which 45% of the particles are of a diameter of less than 2 Fun as measured on the Sedigraph 5100 and containing 0.08% by dry weight of soda, 1.4% by dry weight of an alkylene polyoxide and 0.15% by dry weight of a sodium polyacrylate with a specific viscosity of 0.4 with 100 grams dry weight of an American kaolin with a grain size equivalent to one in which 91% of the particles are of a diameter of less than 0.5 µm as measured by the Sedigraph 5100 to produce an aqueous suspension with a 67.8% concentration of a talc-kaolin mixture.

EXAMPLE 2

This example illustrates the preparation of composite compounds as proposed by the invention using various ratios of pigments or fillers.

To this end, the composite compounds proposed by the invention are prepared using the same method and the same equipment as in test No 2 with the exception of the quantity of water, which is added all at once, to produce the final concentration of dry substance and comprising:

Test No 24:
95% by dry weight, relative to the total dry weight of fillers, of Norwegian marble with a grain size equivalent to one in which 62% of the particles are of a diameter of less than 1 µm as measured with the Sedigraph 5100

5% by dry weight, relative to the total dry weight of fillers, of Finnish talc with a grain size equivalent to one in which 45% of the particles are of a diameter of less than 2 µm as measured by the Sedigraph 5100

0.1% by dry weight, relative to the total dry weight of fillers, of an acrylic copolymer binding agent comprising 90% by weight of acrylic acid and 10% by weight of tristyrylphenol methacrylate with 25 moles of ethylene oxide and placed in aqueous suspension at a 59.8% concentration of cry substance using water and 0.67% by dry weight, relative to the total dry weight of fillers, of a polyacrylate partially neutralised with soda and having a specific viscosity of 0.54.

Test No 25:

90% by dry weight, relative to the total dry weight of fillers, of Norwegian marble with a grain size equivalent to one in which 62% of the particles are of a diameter of less than 1 μm as measured with the Sedigraph 5100

10% by dry weight, relative to the total dry weight of fillers, of Finnish talc with a grain size equivalent to one in which 45% of the particles are of a diameter of less than 2 μm as measured by the Sedigraph 5100

0.2% by dry weight, relative to the total dry weight of fillers, of an acrylic copolymer binding agent comprising 90% by weight of acrylic acid and 10% by weight of tristyrylphenol methacrylate with 25 moles of ethylene oxide and placed in aqueous suspension at a 59.8% concentration of dry substance using water and 0.63% by dry weight, relative to the total dry weight of fillers, of a polyacrylate partially neutralised with soda and having a specific viscosity of 0.54.

Test No 26:

85% by dry weight, relative to the total dry weight of fillers, of Norwegian marble with a grain size equivalent to one in which 75% of the particles are of a diameter of less than 1 μm as measured with the Sedigraph 5100

15% by dry weight, relative to the total dry weight of fillers, of Finnish talc with a grain size equivalent to one in which 45% of the particles are of a diameter of less than 2 μm as measured by the Sedigraph 5100

0.3% by dry weight, relative to the total dry weight of fillers, of an acrylic copolymer binding agent comprising 90% by weight of acrylic acid and 10% by weight of tristyrylphenol methacrylate with 25 moles of ethylene oxide and placed in aqueous suspension at a 34.0% concentration of dry substance using water and 0.78% by dry weight, relative to the total dry weight of fillers, of a sodium polyacrylate having a specific viscosity of 0.54.

Test No 27:

80% by dry weight, relative to the total dry weight of fillers, of Norwegian marble with a grain size equivalent to one in which 62% of the particles are of a diameter of less than 1 μm as measured with the Sedigraph 5100

20% by dry weight, relative to the total dry weight of fillers, of Finnish talc with a grain size equivalent to one in which 45% of the particles are of a diameter of less than 2 μm as measured by the Sedigraph 5100

0.4% by dry weight, relative to the total dry weight of fillers, of an acrylic copolymer binding agent comprising 90% by weight of acrylic acid and 10% by weight of tristyrylphenol methacrylate with 25 moles of ethylene oxide and placed in aqueous suspension at a 59.7% concentration of dry substance using water and 0.56% by dry weight, relative to the total dry weight of fillers, of a polyacrylate partially neutralised with soda and having a specific viscosity of 0.54.

Test No 28:

70% by dry weight, relative to the total dry weight of fillers, of Norwegian marble with a grain size equivalent to one in which 75% of the particles are of a diameter of less than 1 μm as measured with the Sedigraph 5100

30% by dry weight, relative to the total dry weight of fillers, of Finnish talc with a grain size equivalent to one in which 45% of the particles are of a diameter of less than 2 μm as measured by the Sedigraph 5100

0.6% by dry weight, relative to the total dry weight of fillers, of an acrylic copolymer binding agent comprising 90% by weight of acrylic acid and 10% by weight of tristyrylphenol methacrylate with 25 moles of ethylene oxide and placed in aqueous suspension with a 37.5% concentration of dry substance using water and 0.64% by dry weight, relative to the total dry weight of fillers, of a sodium polyacrylate having a specific viscosity of 0.54.

Test No 29:

70% by dry weight, relative to the total dry weight of fillers, of Norwegian marble with a grain size equivalent to one in which 62% of the particles are of a diameter of less than 1 μm as measured with the Sedigraph 5100

30% by dry weight, relative to the total dry weight of fillers, of Finnish talc with a grain size equivalent to one in which 45% of the particles are of a diameter of less than 2 μm as measured by the Sedigraph 5100

0.6% by dry weight, relative to the total dry weight of fillers, of an acrylic copolymer binding agent comprising 90% by weight of acrylic acid and 10% by weight of tristyrylphenol methacrylate with 25 moles of ethylene oxide and placed in aqueous suspension at a 58.0% concentration of dry substance using water and 0.49% by dry weight, relative to the total dry weight of fillers, of a partially neutralised sodium polyacrylate having a specific viscosity of 0.5.

Test No 30:

This test, illustrating the prior art, is a simple mixture of 700 grams dry weight of an aqueous suspension of a Norwegian marble with a grain size equivalent to one in which 62% of the particles are of a diameter of less than 1 μm as measured on the Sedigraph 5100 and containing 1% by dry weight of a sodium polyacrylate with a specific viscosity of 0.7 with 300 grams dry weight of an aqueous suspension of Finnish talc with a grain size equivalent to one in which 45% of the particles are of a diameter of less than 2 μm as measured by the Sedigraph 5100 containing 0.08% by dry weight of soda, 1.4% by dry weight of an alkylene polyoxide and 0.15% by dry weight of a sodium polyacrylate with a specific viscosity of 0.4 to produce an aqueous suspension with a 66.4% concentration of a marble-talc mixture.

Test No 31:

For this test, illustrating the invention, the following composite compound proposed by the invention is prepared, using the same equipment and the same manner as test No 29.

50% by dry weight, relative to the total dry weight of fillers, of Norwegian marble with a grain size equivalent to one in which 62% of the particles are of a diameter of less than 1 μm as measured with the Sedigraph 5100

50% by dry weight, relative to the total dry weight of fillers, of Finnish talc with a grain size equivalent to one in which 45% of the particles are of a diameter of less than 2 μm as measured by the Sedigraph 5100

1.0% by dry weight, relative to the total dry weight of fillers, of an acrylic copolymer binding agent comprising 90% by weight acrylic acid and 10% by weight tristyrylphenol methacrylate with 25 moles of ethylene oxide and placed in aqueous suspension at a 59.8% concentration of dry substance using water and 0.7% by dry weight, relative to the total dry weight of fillers, of a partially neutralised sodium polyacrylate having a specific viscosity of 0.5 and 0.2% by dry weight, relative to the total dry weight of fillers, of a naphthalene sulphonic acid condensate.

Test No 32:

As in the previous test, the following composite compound according to the invention is prepared.

- 25% by dry weight, relative to the total dry weight of fillers, of Norwegian marble with a grain size equivalent to one in which 62% of the particles are of a diameter of less than 1 µm as measured with the Sedigraph 5100
- 75% by dry weight, relative to the total dry weight of fillers, of Finnish talc with a grain size equivalent to one in which 45% of the particles are of a diameter of less than 2 µm as measured by the Sedigraph 5100
- 1.5% by dry weight, relative to the total dry weight of fillers, of an acrylic copolymer binding agent comprising 90% by weight of acrylic acid and 10% by weight of tristyrylphenol methacrylate with 25 moles of ethylene oxide
- and placed in aqueous suspension at a 56.6% concentration of dry substance using water and 0.63% by dry weight, relative to the total dry weight of fillers, of a partially neutralised sodium polyacrylate having a specific viscosity of 0.5 and 0.05% by dry weight, relative to the total dry weight of fillers, of a naphthalene-sulphonate acid condensate.

EXAMPLE 3

This example illustrates the preparation of composite compounds of the invention using different quantities of binding agent for a same pigment or filler composition.

To this end, the composite compounds proposed by the invention are prepared using the same method and the same equipment as in example 2 and comprise:

- 75% by dry weight, relative to the total dry weight of fillers, of Norwegian marble with a grain size equivalent to one in which 62% of the particles are of a diameter of less than 1 µm as measured with the Sedigraph 5100
- 25% by dry weight, relative to the total dry weight of fillers, of Finnish talc with a grain size equivalent to one in which 45% of the particles are of a diameter of less than 2 µm as measured by the Sedigraph 5100
- and, as a binder, a same binding agent in different quantities.

These different quantities of binding agent tested, acrylic copolymer of a monomer composition comprising 90% by weight of acrylic acid and 10% by weight of tristyrylphenol methacrylate with 25 moles of ethylene oxide, are as follows:

Test No 33:

0.13% of binding agent by dry weight relative to the total dry weight of fillers.

An aqueous suspension with a 36.8% concentration of dry substances is formed using water and 0.69% by dry weight, relative to the total dry weight of fillers, of a sodium polyacrylate with a specific viscosity of 0.54.

Test No 34:

0.25% of binding agent by dry weight relative to the total dry weight of fillers.

An aqueous suspension with a 36.6% concentration of dry substances is formed using water and 0.69% by dry weight, relative to the total dry weight of fillers, of a sodium polyacrylate with a specific viscosity of 0.54.

Test No 35:

0.38% of binding agent by dry weight relative to the total dry weight of fillers.

An aqueous suspension with a 36.7% concentration of dry substances is formed using water and 0.69% by dry weight, relative to the total dry weight of fillers, of a sodium polyacrylate with a specific viscosity of 0.54.

Test No 36:

1.25% of binding agent by dry weight relative to the total dry weight of fillers.

An aqueous suspension with a 36.1% concentration of dry substances is formed using water and 0.69% by dry weight, relative to the total dry weight of fillers, of a sodium polyacrylate with a specific viscosity of 0.54.

EXAMPLE 4

This example illustrates the preparation of composite compounds as proposed by the invention using fillers or pigments of different grain sizes.

To this end, the composite compounds proposed by the invention are prepared by the same method and using the same equipment as in example 2 and comprise:

Test No 37:

- 75% by dry weight, relative to the total dry weight of fillers, of Norwegian marble with a grain size equivalent to one in which 62% of the particles are of a diameter of less than 1 µm as measured with the Sedigraph 5100
- 25% by dry weight, relative to the total dry weight of fillers, of Finnish talc with a grain size equivalent to one in which 45% of the particles are of a diameter of less than 2 µm as measured by the Sedigraph 5100
- 0.5% by dry weight, relative to the total dry weight of fillers, of an acrylic copolymer binding agent comprising 90% by weight of acrylic acid and 10% by weight of tristyrylphenol methacrylate with 25 moles of ethylene oxide
- and placed in aqueous suspension at a 36.5% concentration of dry substance using water and 0.69% by dry weight, relative to the total dry weight of fillers, of a sodium polyacrylate having a specific viscosity of 0.54.

Test No 38:

- 75% by dry weight, relative to the total dry weight of fillers, of Norwegian marble with a grain size equivalent to one in which 35% of the particles are of a diameter of less than 1 µm as measured with the Sedigraph 5100
- 25% by dry weight, relative to the total dry weight of fillers, of Finnish talc with a grain size equivalent to one in which 45% of the particles are of a diameter of less than 2 µm as measured by the Sedigraph 5100
- 0.5% by dry weight, relative to the total dry weight of fillers, of an acrylic copolymer binding agent comprising 90% by weight of acrylic acid and 10% by weight of tristyrylphenol methacrylate with 25 moles of ethylene oxide
- and placed in aqueous suspension at a 36.4% concentration of dry substance using water and 0.69% by dry weight, relative to the total dry weight of fillers, of a sodium polyacrylate having a specific viscosity of 0.54.

Test No 39:

- 75% by dry weight, relative to the total dry weight of fillers, of Norwegian marble with a grain size equivalent to one in which 75% of the particles are of a diameter of less than 1 µm as measured with the Sedigraph 5100
- 25% by dry weight, relative to the total dry weight of fillers, of Australian talc with a grain size equivalent to one in which 25% of the particles are of a diameter of less than 2 µm as measured by the Sedigraph 5100
- 0.5% by dry weight, relative to the total dry weight of fillers, of an acrylic copolymer binding agent comprising 90% by weight of acrylic acid and 10% by weight of tristyrylphenol methacrylate with 25 moles of ethylene oxide and placed in aqueous suspension at a 35.4% concentration of dry substance using water and 0.52% by dry weight, relative to the total dry weight of fillers, of a polyacrylate partially neutralised by soda, having a specific viscosity of 0.5.

Test No 40:

75% by dry weight, relative to the total dry weight of fillers, of Norwegian marble with a grain size equivalent to one in which 75% of the particles are of a diameter of less than 1 μm as measured with the Sedigraph 5100

25% by dry weight, relative to the total dry weight of fillers, of American talc with a grain size equivalent to one in which 35% of the particles are of a diameter of less than 2 μm as measured by the Sedigraph 5100

0.5% by dry weight, relative to the total dry weight of fillers, of an acrylic copolymer binding agent comprising 90% by weight of acrylic acid and 10% by weight of tristyrylphenol methacrylate with 25 moles of ethylene oxide and placed in aqueous suspension at a 36.1% concentration of dry substance using water and 0.52% by dry weight, relative to the total dry weigh of fillers, of a polyacrylate partially neutralised by soda having a specific viscosity of 0.5.

Test No 41:

50% by dry weight; relative to the total dry weight of fillers, of Champagne chalk with a grain size equivalent to one in which 36% of the particles are of a diameter of less than 2 μm as measured with the Sedigraph 5100

50% by dry weight, relative to the total dry weight of fillers, of Australian talc with a grain size equivalent to one in which 25% of the particles are of a diameter of less than 2 μm as measured by the Sedigraph 5100

2% by dry weight, relative to the total dry weight of fillers, of an acrylic copolymer binding agent comprising 90% by weight of acrylic acid and 10% by weight of tristyrylphenol methacrylate with 25 moles of ethylene oxide and placed in aqueous suspension at a 59% concentration of dry substance using water and 0.35% by dry weight, relative to the total dry weight of fillers, of a polyacrylate partially neutralised by soda having a specific viscosity of 0.5.

Test No 42:

This test is conducted as a comparison with the preceding test and illustrates the preparation of an aqueous suspension known from the prior art using a standard mixture of 50% by dry weight, relative to the total dry weight of fillers, of Champagne chalk with a grain size equivalent to one in which 36% of the particles are of a diameter of Hess than 2 μm as measured by the Sedigraph 5100 and containing 0.07% by dry weight of a sodium polyacrylate with a specific viscosity of 0.7

50% by dry weight, relative to the total dry weight of fillers, of an aqueous suspension of Australian talc with a grain size equivalent to one in which 25% of the particles are of a diameter of less than 2 Nm as measured by the Sedigraph 5100 containing 0.08% by dry weight of soda, 1.4% by dry weight of an alkylene polyoxide and 0.15% by dry weight of a sodium polyacrylate with a specific viscosity of 0.4 to produce an aqueous suspension with a 71.7% concentration of dry substance of a chalk-talc mixture.

EXAMPLE 5

This example relates to the use of different binding agents.

To this end, the composite compounds proposed by the invention are made using the same method and the same equipment as in test No 2, using as fillers 75% by dry weight, relative to the total dry weight of fillers, of Norwegian' marble with a grain size equivalent to one in which 75% of the particles are of a diameter of less than lam as measured by the Sedigraph 5100 and 25% dry weight, relative to the total dry weight of fillers, of Finnish talc with a grain size equivalent to one in which 45% of the particles are of a diameter of less than 2 μm as measured by the Sedigraph 5100 and, as a binder, different quantities of the following different binding agents:

Test No 43:

0.5% by dry weight, relative to the total dry weight of fillers, of a binding agent which is a polyacrylic acid with a specific viscosity of 1.78.

An aqueous suspension with a 59.7% concentration of dry substances is formed using water and 0.52% by dry weight, relative to the total dry weight of fillers, of a polyacrylate partially neutralised with soda having a specific viscosity of 0.5.

Test No 44:

0.5% by dry weight, relative to the total dry weight of fillers, of a binding agent which is a polyacrylic acid with a specific viscosity of 1.55.

An aqueous suspension with a 60.4% concentration of dry substances is formed using water and 0.52% by dry weight, relative to the total dry weight of fillers, of a polyacrylate partially neutralised with soda having a specific viscosity of 0.5.

Test No 45:

0.5% by dry weight, relative to the total dry weight of fillers, of a binding agent which is a polyacrylic acid with a specific viscosity of 0.95.

An aqueous suspension with a 59.8% concentration of dry substances is formed using water and 0.52% by dry weight, relative to the total dry weight of fillers, of a polyacrylate partially neutralised with soda having a specific viscosity of 0.5.

Test No 46:

0.5% by dry weight, relative to the total dry weight of fillers, of a binding agent which is an acid polyacrylate, 10% neutralised by soda, having a specific viscosity of 5.00.

An aqueous suspension with a 59.9% concentration of dry substances is formed using water and 0.52% by dry weight, relative to the total dry weight of fillers, of a polyacrylate partially neutralised with soda having a specific viscosity of 0.5.

Test No 47:

0.5% by dry weight, relative to the total dry weight of fillers, of a binding agent which is a homopolymer of the methacrylate of ketostearylic alcohol.

An aqueous suspension with a 59.2% concentration of dry substances is formed using water and 0.45% by dry weight, relative to the total dry weight of fillers, of a polyacrylate partially neutralised with soda having a specific viscosity of 0.5.

Test No 48:

0.5% by dry weight, relative to the total dry weight of fillers, of a binding agent which is a copolymer comprising 98% by weight of methacrylic acid and 2% by weight of ketostearylic alcohol methacrylate.

An aqueous suspension with a 59.7% concentration of dry substances is formed using water and 0.52% by dry weight, relative to the total dry weight of fillers, of a polyacrylate partially neutralised with soda having a specific viscosity of 0.5.

Test No 49:

0.025% by dry weight, relative to the total dry weight of fillers, of a binding agent which is a quaternary ammonium chloride having the formula

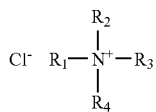

where $R_1$=methyl radical
$R_2$=$R_3$=lauryl radical
$R_4$=benzyl radical.

An aqueous suspension with a 59.3% concentration of dry substances is formed using water and 0.52% by dry weight, relative to the total dry weight of fillers, of a polyacrylate partially neutralised with soda having a specific viscosity of 0.5.

Test No 50:

0.5% by dry weight, relative to the total dry weight of fillers, of a binding agent which is a linear alcohol having 12 carbon atoms.

An aqueous suspension with a 55.0% concentration of dry substances in formed using water and 0.75% by dry weight, relative to the total dry weight of fillers, of a polyacrylate partially neutralised with soda having a specific viscosity of 0.5.

Test No 51:

0.5% by dry weight, relative to the total dry weight of fillers, of a binding agent which is a linear alcohol having 18 carbon atoms.

An aqueous suspension with a 55.1% concentration of dry substances is formed using water and 0.38% by dry weight, relative to the total dry weight of fillers, of a zodium polyacrylate having a specific viscosity of 0.54.

Test No 52:

For this test, illustrating the invention, the aqueous co-structured compound proposed by the invention is prepared by introducing into a mixer under agitation 250 grams dry weight of a Finnish talc of a grain size such that 45% of the particles are of a diameter of less than 2 µm as measured on the Sedigraph 5100, 5 grams dry weight of mixture of monomers comprising 90% by weight of acrylic acid and 10% by weight of tristyrylphenol methacrylate with 25 moles of ethylene oxide, 115 grams of isopropanol as well as the quantity of water needed to make up an aqueous composition with a 30% concentration of dry substance.

After 30 minutes of agitation, the mixture of monomers is polymerised, using known processes of radical polymerisation in a hydro-alcoholic medium.

Once the polymerisation is complete and the isopropanol has been removed by distillation, 750 grams dry weight of Norwegian marble are added, having a grain size such that 75% of the particles are of a diameter less than 1 µm as measured by the Sedigraph 5100.

Once the co-structure has formed between the grains of talc and marble after 30 minutes of agitation, 7 grams by dry weight of a dispersing agent, namely a polyacrylic acid with a specific viscosity of 0.53, are added to obtain an aqueous suspension of the composite compound of the invention having a concentration of dry substance equal to 36.4%.

Test No 53:

This test, illustrating the invention, using the same method and the same equipment as the preceding test, is conducted with 250 grams dry weight of a Finnish talc of a grain size such that 45% of the particles are of a diameter of less than 2 µm as measured on the Sedigraph 5100, 5 grams dry weight of a mixture of monomers comprising 90% by weight of acrylic acid and 10% by weight of tristyrylphenol methacrylate with 25 moles of ethylene oxide, to which are added 5 grams by dry weight of a copolymer comprising 90% by dry weight of acrylic acid and 10% by dry weight of tristyrylphenol methacrylate with 25 moles of ethylene oxide, 115 grams of isopropanol as well as the quantity of water needed to make up an aqueous composition with a 30% concentration of dry substance.

After 30 minutes of agitation, the mixture of monomers is polymerised, using known processes of radical polymerisation in a hydroalcoholic medium.

Once the polymerisation is complete and the isopropanol has been removed by distillation, 750 grams dry weight of Norwegian marble are added, having a grain size such that 75% of the particles are of a diameter less than 1 µm as measured by the Sedigraph 5100.

Once the co-structure has formed between the grains of talc and marble after 30 minutes of agitation, 7 grams by dry weight of a dispersing agent, namely a polyacrylic acid with a specific viscosity of 0.53, are added to obtain an aqueous suspension of the composite compound of the invention having a concentration of dry substance equal to 36.6%.

Test No 54:

This test, illustrating the invention, using the same method and the same equipment as the preceding test, is conducted with 250 grams dry weight of Finnish talc of a grain size such that 45% of the particles are of a diameter of less than 2 µm as measured on the Sedigraph 5100, 12.5 grams dry weight of a mixture of monomers comprising 80% by weight of acrylic acid and 20% by weight of tristyrylphenol methacrylate with 25 moles of ethylene oxide, 115 grams of isopropanol as well as the quantity of water needed to make up an aqueous composition with a 30% concentration of dry substance.

After 30 minutes of agitation, the mixture of monomers is polymerised, using known processes of radical polymerisation in a hydro-alcoholic medium.

Once the polymerisation is complete and the isopropanol has been removed by distillation, 750 grams dry weight of Norwegian marble are added, having a grain size such that 75% of the particles are of a diameter less than 1 µm as measured by the Sedigraph 5100.

Once the co-structure has formed between the grains of talc and marble after 30 minutes of agitation, 7 grams by dry weight of a dispersing agent, namely a polyacrylic acid with a specific viscosity of 0.53, are added to obtain an aqueous suspension of the composite compound of the invention having a concentration of dry substance equal to 36.6%.

Test No 55:

This test, illustrating the invention, using the same method and the same equipment as the preceding test, is conducted with 250 grams dry weight of a Finnish talc of a grain size such that 45% of the particles are of a diameter of less than 2 µm as measured on the Sedigraph 5100, 5 grams dry weight of stearyl methacrylate, 115 grams of isopropanol as well as the quantity of water needed to make up an aqueous composition with a 30% concentration of dry substance.

After 30 minutes of agitation, the monomer is polymerised, using known processes of radical polymerisation in a hydroalcoholic medium.

Once the polymerisation is complete and the isopropanol has been removed by distillation, 750 grams dry weight of Norwegian marble are added, having a grain size such that 75% of the particles are of a diameter less than 1 μm as measured by the Sedigraph 5100.

Once the co-structure has formed between the grains of talc and marble after 30 minutes of agitation, 7 grams by dry weight of a dispersing agent, namely a polyacrylic acid with a specific viscosity of 0.53, are added to obtain an aqueous suspension of the composite compound of the invention having a concentration of dry substance equal to 36.7%.

EXAMPLE 6

This example is intended to demonstrate the formation of the co-structure or co-adsorption by measuring and comparing the homogeneity of the different suspensions of composite compounds obtained by diluting to a 20% concentration of dry substance.

To this end, the various aqueous suspensions of the composite compounds proposed by the invention and the suspensions of the prior art are diluted to a 20% concentration. Their macroscopic cohesion is measured using the homogeneity test consisting in determining the content of dry filler having at least one hydrophilic site at two separate points of the suspension representative of the test, namely a point located at the base of the flask and a point located on the surface of the flask after drying the suspension in an oven.

Once dry, the calcium ion content of each sample is determined after dissolving in HC1 using EDTA sequestering techniques at a pH of 12 and with a coloured indicator, Eriochrome® Black T.

Test No 56:
For this test, illustrating the prior art, the aqueous suspension of the mixture described in test No 1 is used.

Test No 57:
For this test, illustrating the invention, the aqueous suspension described in test No 47 is used.

Test No 58:
For this test, illustrating the invention, the aqueous suspension described in test No 43 is used.

Test No 59:
For this test, illustrating the invention, the aqueous suspension described in test No 44 is used.

Test No 60:
For this test, illustrating the invention, the aqueous suspension described in test No 45 is used.

Test No 61:
For this test, illustrating the invention, the aqueous suspension described in test No 46 is used.

Test No 62:
For this test, illustrating the invention, the aqueous suspension described in test No 48 is used.

Test No 63:
For this test, illustrating the invention, the aqueous suspension described in test No 49 is used Test No 64:
For this test, illustrating the invention, the aqueous suspension described in test No 50 is used.

Test No 65:
For this test, illustrating the invention, the aqueous suspension described in test No 51 is used.

Test No 66:
For this test, illustrating the prior art, the aqueous suspension described in test No 11 is used.

Test No 67:
For this test, illustrating the invention, the aqueous suspension of the composite compound of test No 12 is used.

Test No 68:
For this test, illustrating the prior art, the aqueous suspension of the mixture described in test No 13 is used.

Test No 69:
For this test, illustrating the invention, the aqueous suspension of the composite compound of test No 14 is used.

Test No 70:
For this test, illustrating the prior art, the aqueous suspension described in test No 15 is used.

Test No 71:
For this test, illustrating the invention, the aqueous suspension described in test No 16 is used.

Test No 72:
For this test, illustrating the prior art, the aqueous suspension described in test No 17 is used.

Test No 73:
For this test, illustrating the invention, the aqueous suspension described in test No 18 is used.

Test No 74:
For this test, illustrating the prior art, the aqueous suspension described in test No 19 is used.

Test No 75:
For this test, illustrating the invention, the aqueous suspension described in test No 20 is used.

Test No 76:
For this test, illustrating the prior art, the aqueous s suspension described in test No 42 is used.

Test No 77:
For this test, illustrating the invention, the aqueous suspension described in test No 41 is used.

Test No 78:
For this test, illustrating the invention, the aqueous suspension described in test No 29 is used.

Test No 79:
For this test, illustrating the prior art, the aqueous suspension described in test No 30 is used.

Test No 80:
For this test, illustrating the invention, the aqueous suspension described in test No 52 is used.

Test No 81:
For this test, illustrating the invention, the aqueous suspension described in test No 53 is used.

Test No 82:
For this test, illustrating the invention, the aqueous suspension described in test No 54 is used Test No 83:
For this test, illustrating the invention, the aqueous suspension described in test No 55 is used.

Test No 84:
For this test, illustrating the prior art, the aqueous suspension described in test No 23 is used.

It should be pointed out that in this test, the method used to measure the macroscopic homogeneity of the suspension is different from that of the preceding tests. In effect, the quantities are not metered by sequestering techniques but by RFA analysis, which involves taking 0.2 g of the dry sample which is mixed with 1.625 g of lithium tetraborate, which is heated to melting temperature to obtain a disc, which is placed in a XRF 9400 machine made by ARL (Switzerland) to determine the elements by readings of the oxides present and then calculating the kaolin present.

The results of all the experiments are set out in Table 1 below.

TABLE 1

| TEST N° | HOMOGENEITY<br>% CaCO$_3$ at the surface<br>% CaCo$_3$ at the base |
|---|---|
| Prior art | 56 | 93.4 – 14.9 |
| Invention | 57 | 72.5 – 74.8 |
| Invention | 58 | 73.0 – 75.5 |
| Invention | 59 | 73.7 – 73.7 |
| Invention | 60 | 73.4 – 73.9 |
| Invention | 61 | 73.9 – 73.2 |
| Invention | 62 | 74.9 – 76.6 |
| Invention | 63 | 75.7 – 75.2 |
| Invention | 64 | 75.3 – 74.5 |
| Invention | 65 | 73.9 – 73.8 |
| Prior art | 66 | 74.7 – 63.9 |
| Invention | 67 | 74.4 – 73.4 |
| Prior art | 68 | 88.9 – 25.4 |
| Invention | 69 | 73.2 – 72.5 |
| Prior art | 70 | 90.2 – 37.1 |
| Invention | 71 | 83.1 – 83.5 |
| Prior art | 72 | 45.2 – 89.1 |
| Invention | 73 | 85.0 – 82.1 |
| Prior art | 74 | 29.6 – 85.5 |
| Invention | 75 | 81.7 – 80.5 |
| Prior art | 76 | 33.6 – 54.6 |
| Invention | 77 | 49.6 – 49.6 |
| Invention | 78 | 68.8 – 69.2 |
| Prior art | 79 | 91.9 – 32.5 |
| Invention | 80 | 74.8 – 74.1 |
| Invention | 81 | 74.6 – 73.6 |
| Invention | 82 | 74.4 – 75.4 |
| Invention | 83 | 70.3 – 72.7 |
| Prior art | 84 | 23.0 – 2.0* |

*% kaolin at the surface – % kaolin at the base

Table I demonstrates that the aqueous suspensions containing the co-structured composite compounds of the invention have a more homogeneous content of fillers with at least one hydrophilic site at different points than those containing the standard mixtures of the prior art.

EXAMPLE 7

This example demonstrates the formation of the co-structure or co-adsorption by measuring and comparing the viscosity and homogeneity of different paper coating colors produced.

To this end, the coating colors are prepared (tests 85 to 94) by mixing in water the composite compounds of fillers or pigments to be tested with 100 parts of compound to be tested at 65% of dry substance
12.5 parts of a carboxylated styrene-butadiene latex sold under the name of DL950 by Dow Chemical and a quantity of water needed to obtain a 40% content of dry substances for tests No 85 to 92 and a content of dry substance in the order of 20% for tests No 93 and 94.

The Brookfield viscosities of the coating colors prepared in this manner are then measured at ambient temperature at 20 revolutions/minute and 100 revolutions per minute using a Brookfield viscometer of the DVII type fitted with an appropriate spindle.

They are then tested for homogeneity using the same operating method as that described for the preceding example.

Test No 85:

For this test, illustrating a coating color of the invention, the aqueous suspension of the composite compound of test No 2 is used.

Test No 86:

For this test, illustrating a coating color of the prior art, the aqueous suspension of the mixture of test No 1 is used.

Test No 87:

For this test, illustrating a coating color of the invention, the aqueous suspension of the composite compound of test No 4 is used.

Test No 88:

For this test, illustrating a coating color of the prior art, the aqueous suspension of the mixture of test No 3 is used.

Test No 89:

For this test, illustrating a coating color of the invention, the aqueous suspension of the composite compound of test No 6 is used.

Test No 90:

For this test, illustrating a coating color of the prior art, the aqueous suspension of the mixture of test No 5 is used.

Test No 91:

For this test, illustrating a coating color of the invention, the aqueous suspension of the composite compound of test No 8 is used.

Test No 92:

For this test, illustrating a coating color of the prior art, the aqueous suspension of the mixture of test No 7 is used.

Test No 93:

For this test, illustrating a coating color of the invention, the aqueous suspension of the composite compound of test No 10 is used.

Test No 94:

For this test, illustrating a coating color of the prior art, the aqueous suspension of the mixture of test No 9 is used.

The results of all the experiments are set out in Table 2, the consistency of the coating colors of each of the tests being determined by introducing a spatula containing said coating colors.

TABLE 2

| | TES N° | VISCOS-ITY in mPa·s (20 r/mn) | VISCOS-ITY in mPa·s (100 r/mn) | CONSIS-TENCY | HOMOGENEITY<br>% CaCO$_3$<br>at surface<br>CaCO$_3$<br>at the base |
|---|---|---|---|---|---|
| Invention | 85 | 190 | 66 | Soft | 63.5 – 63.1 |
| Prior art | 86 | 14 | 24 | Hard | 76.1 – 34.8 |
| Invention | 87 | 765 | 180 | Soft | 62.6 – 63.0 |
| Prior art | 88 | 110 | 60 | Medium hard | 75.5 – 22.3 |
| Invention | 89 | 75 | 50 | Soft | 61.2 – 64.1 |
| Prior art | 90 | 16 | 29 | Hard | 65.8 – 48.5 |
| Invention | 91 | 242 | 88 | Soft | 64.1 – 64.4 |
| Prior art | 92 | 18 | 20 | Hard | 68.0 – 23.0 |
| Invention | 93 | 885 | 217 | Soft | 62.6 – 63.3 |
| Prior art | 94 | 55 | 47 | Medium hard | 66.4 – 50.5 |

Table 2 demonstrates that the coating colors of the invention containing the aqueous suspensions of co-structured composite compounds proposed by the invention are soft in appearance and have a higher Brookfield viscosity than that of the standard comparative mixtures of the prior art, thereby illustrating the co-structuring of the fillers or pigments. It is also clear that they have a more homogeneous content of fillers having at least one hydrophilic site at different points of the coating colors than that contained in the standard mixtures of the prior art.

EXAMPLE 8

This example relates to the measurements taken on the rheological behaviour of different aqueous compounds prepared in accordance with the method used in example 1.

The rheological behaviour of the different aqueous suspensions prepared in the same way as that used for example 1 is measured for viscoelasticity at 20° C. using a Stress Tech® device by Reologica Instruments AB (Sweden) fitted with CC25 coaxial cylinders.

The same method was used to measure the rheological behaviour of the suspension produced in each of the tests, namely a sample of the suspension to be tested is injected into the cylinder of the viscoelasticity-measuring device and is pre-stressed at 10 Pa for 12 seconds and, after a waiting time of 180 seconds, stress is applied at a linear progression from 0.025 Pa to 20 Pa in 100 seconds and 40 intervals.

The yield stress, corresponding to the stress applied to the suspension to break the internal bonds and obtain a suspension of a reduced viscosity is determined by the maximum value of the viscosity curve in Pa·s as a function of the stress in Pa.

Test No 95:
For this test, illustrating the invention, the aqueous suspension of the composite compound of test No 2 is used.

Test No 96:
For this test, illustrating the prior art, the aqueous suspension of the mixture of test No 1 is used.

Test No 97:
For this test, illustrating the invention, the aqueous suspension of the composite compound of test No 4 is used.

Test No 98:
For this test, illustrating the prior art, the aqueous suspension of the mixture of test No 3 is used.

Test No 99:
For this test, illustrating the invention, the aqueous suspension of the composite compound of test No 6 is used.

Test No 100:
For this test, illustrating the prior art, the aqueous suspension of the mixture of test No 5 is used.

Test No 101:
For this test, illustrating the invention, the aqueous suspension of the composite compound of test No 8 is used.

Test No 102:
For this test, illustrating the prior art, the aqueous suspension of the mixture of test No 7 is used.

Test No 103:
For this test, illustrating the invention, the aqueous suspension of the composite compound of test No 10 is used.

Test No 104:
For this test, illustrating the prior art, the aqueous suspension of the mixture of test No 9 is used.

Test No 105:
For this test, illustrating the invention, the aqueous suspension of the composite compound of test No 12 is used.

Test No 106:
For this test, illustrating the prior art, the aqueous suspension of the mixture of test No 11 is used.

Test No 107:
For this test, illustrating the invention, the aqueous suspension of the composite compound of test No 14 is used.

Test No 108:
For this test, illustrating the prior art, the aqueous suspension of the mixture of test No 13 is used.

Test No 109:
For this test, illustrating the prior art, the aqueous suspension of the mixture of test No 15 is used.

Test No 110:
For this test, illustrating the invention, the aqueous suspension of the composite compound of test No 16 is used.

Test No 111:
For this test, illustrating the prior art, the aqueous suspension of the mixture of test No 17 is used.

Test No 112:
For this test, illustrating the invention, the aqueous suspension of the composite compound of test No 18 is used.

Test No 113:
For this test, illustrating the invention, the aqueous suspension of the composite compound of test No 41 is used.

Test No 114:
For this test, illustrating the prior art, the aqueous suspension of the mixture of test No 42 is used.

Test No 115:
For this test, illustrating the invention, the aqueous suspension of the composite compound of test No 52 is used.

Test No 116:
For this test, illustrating the invention, the aqueous suspension of the composite compound of test No 53 is used.

Test No 117:
For this test, illustrating the invention, the aqueous suspension of the composite compound of test No 54 is used.

Test No 118:
For this test, illustrating the invention, the aqueous suspension of the composite compound of test No 55 is used.

The results of all the experiments are set out in Table 3 below:

TABLE 3

|  | TEST N° | VISCOSITY in Pa·s | YIELD STRESS in Pa |
|---|---|---|---|
| Invention | 95 | 642 | 3.072 |
| Prior art | 96 | 6.90 | 0.04465 |
| Invention | 97 | 164 | 0.9573 |
| Prior art | 98 | 1.49 | 0.03728 |
| Invention | 99 | 14 700 | 8.141 |
| Prior art | 100 | 0.527 | 0.03056 |
| Invention | 101 | 235 | 0.5842 |
| Prior art | 102 | 3.07 | 0.02965 |
| Invention | 103 | 1330 | 1.708 |
| Prior art | 104 | 38.4 | 0.3594 |
| Invention | 105 | 286 | 0.709 |
| Prior art | 106 | 12.32 | 0.079 |
| Invention | 107 | 2157 | 4.824 |
| Prior art | 108 | 4.81 | 0.102 |
| Prior art | 109 | 1.56 | 0.047 |
| Invention | 110 | 92 | 0.445 |
| Prior art | 111 | 43.2 | 0.099 |
| Invention | 112 | 589 | 0.336 |
| Invention | 113 | 938 | 1.580 |
| Prior art | 114 | 40.6 | 0.185 |
| Invention | 115 | 222 | 0.395 |
| Invention | 116 | 8.6 | 0.149 |
| Invention | 117 | 339 | 0.741 |
| Invention | 118 | 9.1 | 0.198 |

Table 3 demonstrates that the aqueous suspensions of the co-structured composite compound of the invention have a higher yield stress than that of the standard comparative mixtures of the prior art, characteristic of suspensions exhibiting good stability.

EXAMPLE 9

This example demonstrates the quality of the printability of the different paper coating colors produced in example 7.

This printability test, known as ISIT (Ink Surface Interaction Test) is based on a printing machine fitted with a device for creating and measuring the force needed to separate a contact disk from a film of printing ink. This machine consists on the one hand of the device which creates and measures the force and on the other an inking disk which rotates above the sheet of paper to be tested and is sold under the name of <<Ink Surface Interaction Tester>> by SeGan Ltd.

To this end, the different sheets of paper to be tested are prepared by applying the various coating colors to be tested on these sheets of paper using the Erichsen Model 624 laboratory coater made by Erichsen GmbH & Co. KG (Germany) fitted with detachable rotating blade coaters.

Once it has been coated with 7.5 g/m$^2$, the paper to be tested is fixed on a roll fitted with a two-sided adhesive tape. An offset ink is applied by placing the inking disk in contact with a width of 25 mm as it is rotated 180°. The printing speed and pressure are adjustable and are in the order of 0.5 m/s and 50 kg respectively. The volume of ink is under standard conditions of 0.3 cm$^3$ thus applying a thickness of approximately 1 g/m$^2$ to the sheet of paper to be tested.

The printing process is followed by a series of measurements to determine the tack force repeated at pre-selected time intervals depending on the time taken to separate the tack disk (of the same dimensions as the printing disk) from the film of ink.

A coating of offset-print quality nitrile rubber is usually used for the tack disk but any equivalent material may be used.

The contact force between the tack disk and the ink is measured by a system which generates an electromagnetic force. The amplitude and duration of the contact force are adjusted until a uniform adhesion is reached between the surface of the film and the tack disk at the end of 3 seconds. Rotating the sheet of paper slightly whilst the electromagnetic force is applied will ensure a close contact and continuity of the film of ink. Once the magnetic force is stopped, the tack disk is pulled back from the printed film by the force of a tensed spring, this force being sufficient to separate the disk from the film of ink. A strain gauge, mounted between the tack disk and the spring, generates a signal which is recorded as the tack force.

The sequence is automatically repeated for 13 cycles.

On the first and the thirteenth cycles, the printing densities are measured using a Gretag D 186 densitometer.

This operating method is used for each of the coating colors to be tested, as follows:

Test No 119:
Illustrating the invention, the coating color of test No 85 is used.
Test No 120:
Illustrating the prior art, the coating color of test No 86 is used.
Test No 121:
Illustrating the invention, the coating color of test No 87 is used.
Test No 122:
Illustrating the prior art, the coating color of test No 88 is used.
Test No 123:
Illustrating the invention, the coating color of test No 89 is used.
Test No 124:
Illustrating the prior art, the coating color of test No 90 is used.
Test No 125:
Illustrating the invention, the coating color of test No 91 is used.
Test No 126:
Illustrating the prior art, the coating color of test No 92 is used.
Test No 127:
Illustrating the invention, the coating color of test No 93 is used.
Test No 128:
Illustrating the prior art, the coating color of test No 94 is used.

The results of all the experiments are set out in Tables 4 and 5 below and graphs 1 to 5 appended to this application.

Table 4 contains the results showing values of the tack force as a function of time whilst Table 5 gives the values of the printing density for tests 119 to 122.

Graphs 1 to 5 show the force which has to be applied to separate the disk from the film after printing as a function of time and can be interpreted taking the following three phases into account:

(i) the rise time,
which essentially relates to the absorption and penetration speed of the ink as it makes initial contact with the surface to be printed.
The microporosity and wettability of this surface are major factors in terms of the rise time of this force.
The longer the rise time to the maximum value of the force, the more efficiently the binder of the ink is absorbed, the less the film of ink will be susceptible to splitting and the better the adhesion between the ink and the paper, thus producing a better result.

(ii) The maximum value of the tack force,
which measures on the one hand the adhesion of the layer of ink which is immobilised on contact, the printing substrate and, on the other hand, the cohesion with the ink contained on the surface of the substrate. Consequently, the higher this maximum value of tack force for a constant cohesion, the better the adhesion will be and the better the print will be.

(iii) The fall time of the force,
which represents the drying of the ink.
The slower this fall time, the slower the ink will dry, the less likelihood there will be of splitting in the structure of the ink and the better the print will be.

TABLE 4

| | Test 119 Invention | Test 120 Prior art | Test 121 Invention | Test 122 Prior art | Test 123 Invention | Test 124 Prior art | Test 125 Invention | Test 126 Prior art | Test 127 Invention | Test 128 Prior art |
|---|---|---|---|---|---|---|---|---|---|---|
| Time: 5 seconds | Force: 1.59 | Force: 3.93 | Force: 2.73 | Force: 3.74 | Force: 3.94 | Force: 4.32 | Force: 2.82 | Force: 2.70 | Force: 3.29 | Force: 4.67 |
| Time: 15 | Force: | Force: | Force: | Force: | Force: | Force: | Force: | Force: | Force: | Force: |

TABLE 4-continued

| | Test 119 Invention | Test 120 Prior art | Test 121 Invention | Test 122 Prior art | Test 123 Invention | Test 124 Prior art | Test 125 Invention | Test 126 Prior art | Test 127 Invention | Test 128 Prior art |
|---|---|---|---|---|---|---|---|---|---|---|
| seconds | 5.22 | 6.39 | 5.52 | 5.98 | 6.61 | 5.34 | 5.08 | 4.99 | 6.60 | 6.55 |
| Time: 26 seconds | Force: 6.71 | Force: 6.11 | Force: 6.46 | Force: 5.89 | Force: 6.77 | Force: 5.27 | Force: 6.30 | Force: 5.39 | Force: 7.38 | Force: 6.08 |
| Time: 37 seconds | Force: 7.19 | Force: 5.68 | Force: 6.85 | Force: 5.52 | Force: 6.36 | Force: 4.84 | Force: 6.37 | Force: 5.28 | Force: 7.22 | Force: 5.30 |
| Time: 57 seconds | Force: 7.21 | Force: 5.45 | Force: 6.84 | Force: 5.50 | Force: 5.63 | Force: 4.63 | Force: 6.10 | Force: 4.63 | Force: 6.1° | Force: 3.74 |
| Time: 78 seconds | Force: 6.77 | Force: 4.61 | Force: 6.64 | Force: 4.88 | Force: 5.44 | Force: 3.89 | Force: 5.46 | Force: 3.04 | Force: 5.00 | Force: 3.07 |
| Time: 98 seconds | Force: 6.06 | Force: 4.41 | Force: 6.37 | Force: 4.71 | Force: 4.56 | Force: 2.95 | Force: 5.05 | Force: 2.73 | Force: 4.00 | Force: 2.10 |
| Time: 139 seconds | Force: 5.34 | Force: 3.25 | Force: 5.38 | Force: 4.30 | Force: 3.51 | Force: 2.42 | Force: 4.16 | Force: 1.65 | Force: 3.25 | Force: 1.25 |
| Time: 179 seconds | Force: 5.07 | Force: 2.27 | Force: 4.66 | Force: 3.04 | Force: 2.59 | Force: 2.09 | Force: 3.15 | Force: 0.93 | Force: 1.73 | Force: 0.79 |
| Time: 220 seconds | Force: 4.54 | Force: 1.67 | Force: 3.80 | Force: 2.22 | Force: 2.37 | Force: 1.57 | Force: 2.78 | Force: 1.39 | Force: 1.36 | Force: 0.72 |
| Time: 281 seconds | Force: 3.67 | Force: 1.02 | Force: 3.22 | Force: 1.42 | Force: 2.03 | Force: 0.99 | Force: 2.24 | Force: 1.32 | Force: 1.16 | Force: 0.64 |
| Time: 341 seconds | Force: 3.12 | Force: 0.88 | Force: 2.67 | Force: 1.01 | Force: 1.21 | Force: 0.90 | Force: 1.55 | Force: 1.19 | Force: 0.71 | Force: 0.59 |
| Time: 402 seconds | Force: 3.23 | Force: 0.92 | Force: 2.43 | Force: 0.86 | Force: 1.30 | Force: 0.89 | Force: 1.56 | Force: 1.07 | Force: 0.72 | Force: 0.66 |

TABLE 5

| | Test N° | Print density 1st cycle | Print density 13th cycle |
|---|---|---|---|
| Invention | 119 | 1.58 | 1.05 |
| Prior art | 120 | 1.49 | 0.97 |
| Invention | 121 | 1.52 | 1.05 |
| Prior art | 122 | 1.48 | 0.94 |

Table 4 and graphs No 1 to 5 demonstrate that the coating colors proposed by the invention have slower rise and fall times and higher tack force values, which means that they exhibit better printability in terms of adhesion, brightness and print yield.

Table 5 demonstrates that the coating colors of the invention have higher print densities than those of the comparative coating colors known from the prior art.

EXAMPLE 10

This example relates to the opacity measurement and more specifically to determining the light scattering coefficient S of the various coating colors.

The method used to determine the light coefficient S, well known to those skilled in the art, is as follows:

For each test, a sheet of paper containing no wood is coated with the coating color to be tested.

Before being coated and prior to each test, this sheet of paper, the dimensions of which are 10 cm×6 cm and with a specific weight of 75.5 g/m², is weighed and then irradiated with light of a wavelength equal to 457 nm on a black plate using an Elrepho 2000 spectrophotometer by Datacolor (Switzerland) to determine the base reflection index $R_b$.

Each of the coating colors to be tested is then applied to this pre-weighed sheet of paper with a laboratory coater fitted with detachable rotating coating blades sold as reference model 624 by Erichsen (Germany). Each sheet of paper coated in this manner at 7.5 g/m² is then irradiated with light of a wavelength equal to 457 nm by means of an Elrepho 2000 spectrophotometer by Datacolor (Switzerland) on a black plate to determine the reflection index $R_0$ and on a stack of sheets of paper which have not been coated in order to determine the reflection index $R_1$, where r is the reflection index of the stack of uncoated sheets of paper.

The reflection index $R_{SC}$ of the single coat, on a black background, is then determined using the formula:

$$R_{sc} = \frac{R_1 \cdot R_b - R_0 \cdot r}{(r_1 - R_0) \cdot rR_0 + R_b - r}$$

and the transmittance $T_{SC}$ of the coating $$T_{sc}^2 = \frac{(R_0 - R_{sc})(1 - R_{sc}R_b)}{R_b}$$

to obtain a theoretic reflection value $R_\_$ for a coating of infinite thickness given by the formula:

$$\frac{1 - T_{sc}^2 + R_{sc}^2}{R_{sc}} = \frac{1 + R_\_^2}{R_\_}$$

The scattering coefficient S characteristic of the opacity can be calculated from this formula, knowing that, for a coating weight P, $$S.P. = \frac{1}{b} \coth^{-1} \frac{(1 - aR_{sc})}{bR_{sc}}$$

$$a = 0.5\left(\frac{1}{R_\_} + R_\_\right)$$

where $$b = 0.5\left(\frac{1}{R_\_} + R_\_\right)$$

Test No 129:

For this test, illustrating the prior art, the coating color of test No 86 is used.

Test No 130:

For this test, illustrating the invention, the coating color of test No 85 is used.

Test No 131:

For this test, illustrating the prior art, the coating color of test No 88 is used.

Test No 132:

For this test, illustrating the invention, the coating color of test No 87 is used.

All the results are set out in Table 6 below:

TABLE 6

|  | PRIOR ART | INVENTION | PRIOR ART | INVENTION |
|---|---|---|---|---|
| TEST N° | 129 | 130 | 131 | 132 |
| S in m²/kg | 143 | 157 | 104 | 136 |

Table 6 demonstrates that the coating colors of the invention have a higher light scattering coefficient S than the comparative coating colors of the prior art.

EXAMPLE 11

This example relates to the direct opacity measurement and the whiteness of the coating colors in compliance with the TAPPI T452 ISO 2470 standard.

For each test, a sheet of paper containing no wood and of dimensions 10 cm×6 cm, having a specific weight of 75.5 g/m², is coated with the coating color to be tested using a laboratory coating machine with removable rotating blade coaters, marketed as Model 624 by Erichsen (Germany).

Each sheet of paper coated in this manner with 7.5 g/m² is then exposed to light of a wavelength of 457 nm using an Elrepho 2000 spectrophotometer by Data Color (Switzerland) to determine the opacity and whiteness.

This example also relates to the brightness measurement. The brightness measurement is taken on the same coated sheets of paper as those used to take the direct opacity and whiteness measurements.

This method involves feeding the coated sheet of paper into the laboratory brightness meter, LGDL-05/2 Lehmann Messtechnik AG, Switzerland) which measures the 75° TAPPI brightness according to Lehmann.

Test No 133:

For this test, illustrating the prior art, the coating color of test No 88 is used.

Test No 134:

For this test, illustrating the invention, the coating color of test No 87 is used.

Test No 135:

For this test, illustrating the prior art, the coating color of test No 92 is used.

Test No 136:

For this test, illustrating the invention, the coating color of test No 91 is used.

Test No 137:

For this test, illustrating the prior art, the coating color of test No 94 is used.

Test No 138:

For this test, illustrating the invention, the coating color of test No 93 is used.

The results of the opacity measurement experiments are set out in Table 7 below:

TABLE 7

|  | PRIOR ART | INVENTION |
|---|---|---|
| TEST N° | 133 | 134 |
| OPACITY | 91.1% | 92.2% |

The results of the whiteness measurement experiments are set out in Table 8 below:

TABLE 8

|  | PRIOR ART | INVENTION |
|---|---|---|
| TEST N° | 135 | 136 |
| WHITENESS | 84.8% | 87.6% |

The results of the brightness measurement experiments are set out in Table 9 below:

TABLE 9

|  | PRIOR ART | INVENTION |
|---|---|---|
| TEST N° | 137 | 138 |
| BRIGHTNESS | 41.4% | 48.6% |

Tables 7 to 9 demonstrate that the coating colors of the invention have a higher opacity, whiteness and brightness than those produced by the comparative coating colors of the prior art.

EXAMPLE 12

This example relates to the opacity measurement conforming to the DIN 53146 standard and the whiteness of sheets of paper containing, in the mass, the uncoated filling compounds proposed by the invention and comparisons of these with those containing the standard suspensions of mixtures of the prior art.

To this end, sheets of paper are made from a cellulose pulp of SR 23 degree containing a woodless sulphate paste and fibres comprising 80% birch and 20% pine. 45 g dry weight of this pulp are then diluted in 10 liters of water in the presence of about 15 g dry weight of the filler composition to be tested to produce experimentally a filler content of 20%. After 15 minutes of agitation and adding 0.06% by dry weight, relative to the dry weight of paper, a retention agent of the polyacrylamide type, a sheet is made with a grammage equal to 75 g/m² and filled to 20%. The device used to make the sheet is a Rapid-Köthen 20.12 MC model by Haage.

The sheets prepared in this manner are dried for 400 seconds at 92° C. and in a vacuum of 940 mbar. The filler content is controlled by analysing the ashes.

The different values for opacity and whiteness are then determined using the same method as before.

The following tests were conducted.

Test No 139:

For this test, illustrating the prior art, the mixture of test No 1 is used.

Test No 140:

For this test, illustrating the invention, the composite compound of test No 2 is used.

Test No 141:

For this test, illustrating the prior art, the mixture of test No 3 is used.

Test No 142:

For this test, illustrating the invention, the composite compound of test No 4 is used.

The results of the whiteness measurement experiments are set out in Table 10 below:

TABLE 10

|  | PRIOR ART | INVENTION |
|---|---|---|
| TEST N° | 139 | 140 |
| WHITENESS | 86.9 | 87.7 |

The results of the opacity measurement experiments are set out in Table 11 below:

TABLE 11

|  | PRIOR ART | INVENTION |
|---|---|---|
| TEST N° | 141 | 142 |
| OPACITY | 88.7 | 90.3 |

Tables 10 and 11 demonstrate that the sheets filled with the co-structured composite compounds of the invention have a higher opacity and whiteness than those filled with the standard mixtures of the prior art.

EXAMPLE 13

This example relates to the opacity measurement and more specifically to determining the light scattering coefficient S of an aqueous paint composition containing, essentially water and 100 parts of the composite compound to be tested with a 65% dry content as well as 9.8 parts of a binder polymeric dispersion of the styrene-acrylic type.

This coefficient is measured by using the same way that used for example 10, except that the support to be coated is not a sheet of paper but an aluminum sheet.

The obtained results are completely the sames as those obtained in the tests No. 129 and No. 130, and so demonstrate that the paint compositions according to the invention have a higher light scattering S coefficient than a paint composition of the prior art and so an increased opacity.

From the results of the example 10, the skilled man in the art was expecting the results of the example 13.

In fact, this S coefficient, as confirmed by the disclosed calculation in the example 10, is independent from the support (paper or metal or cement sheet) and depends only from the coating composition i.e. from the paper coating color or from the paint composition.

The invention claimed is:

1. A sheet of paper, which contains a filling composition which is comprised of a composite compound of mineral or organic fillers or pigments, which is a combination of at least two mineral or organic fillers or pigments in the form of particles, at least one of which has a surface with at least one hydrophilic site and the other at least has at least one of which has a surface with at least one organophilic site, the particles being co-structured or co-adsorbed by being blended with at least one binding agent.

2. The sheet of paper as claimed in claim 1, which has a higher opacity determined in accordance with the description of DIN 53146 standard in comparison to that of a sheet of paper containing a suspension of mixed suspensions of said mineral or organic fillers or pigments which are not co-structured or co-adsorbed.

3. The sheet of paper as claimed in claim 1, which has a higher whiteness determined in accordance with the description of TAPPI T452 ISO 2470 standard in comparison to that of a sheet of paper coated with a suspension of mixed suspensions of said mineral or organic fillers or pigments which are not co-structured or co-adsorbed.

* * * * *